(12) United States Patent
Abers

(10) Patent No.: US 11,047,369 B1
(45) Date of Patent: Jun. 29, 2021

(54) MULTIPLE TORQUES INERTIAL THRUSTER ENGINE AND METHODOLOGY

(71) Applicant: Mark David Abers, Mount Olive, NC (US)

(72) Inventor: Mark David Abers, Mount Olive, NC (US)

(*) Notice: Subject to any disclaimer, the term of this patent is extended or adjusted under 35 U.S.C. 154(b) by 0 days.

(21) Appl. No.: 15/944,754

(22) Filed: Apr. 3, 2018

Related U.S. Application Data

(60) Provisional application No. 62/481,270, filed on Apr. 4, 2017.

(51) Int. Cl.
   *F03G 3/08* (2006.01)
(52) U.S. Cl.
   CPC ..................... *F03G 3/08* (2013.01)
(58) Field of Classification Search
   CPC ......... Y10T 74/18528; Y10T 74/18536; Y10T 74/1856; Y10T 74/1225; F03G 3/08; F03G 3/06
   USPC ............................ 74/84 R, 84 S, 86, 88, 5.37
   See application file for complete search history.

(56) References Cited

U.S. PATENT DOCUMENTS

| | | | | |
|---|---|---|---|---|
| 5,024,112 A | * | 6/1991 | Kidd | G01C 19/02 74/5.37 |
| 7,152,495 B2 | * | 12/2006 | Peck | B64G 1/286 74/5.47 |
| 7,900,874 B2 | * | 3/2011 | Fiala | F03G 3/08 244/171.5 |
| 8,066,226 B2 | * | 11/2011 | Fiala | F03H 99/00 244/171.5 |
| 8,491,310 B2 | * | 7/2013 | Gutsche | G09B 23/08 434/300 |
| 2004/0250636 A1 | * | 12/2004 | Macphail | F03G 3/08 74/5.1 |
| 2016/0161255 A1 | | 6/2016 | McGuinness et al. | |

FOREIGN PATENT DOCUMENTS

GB 2527064 A * 12/2015 ............ F03G 3/08

* cited by examiner

*Primary Examiner* — Michael McCullough

(57) ABSTRACT

This invention discloses an inertial-thruster architecture wherein active and passive damping techniques result in the redirection, absorption, neutralization, and/or enhancement of the effect of torque-induced precession on both oscillatory and rotary devices. These novel mechanical and methodological embodiments demonstrate that the redirection of precession during the appropriate phase of operations will achieve the objective of rectilinear movement when combined with the displacement of one or more precessable masses.

23 Claims, 20 Drawing Sheets

$$\omega_p = ma_g r / I_s \omega_s$$

MULTIPLE TORQUES INERTIAL THRUSTER ENGINE AND METHODOLOGY

CROSS REFERENCED TO RELATED APPLICATIONS

This application claims priority to U.S. Provisional patent application No. 62/481,270, (titled "Multiple Torques Inertial Thruster Engine (MUTINTE)", filed on Apr. 4, 2017 which is incorporated by reference herein, in its entirety and for all purposes.

Notice to File Missing Parts: This substitute specification contains no new matter that affects the scope or nature of the invention as disclosed in the original patent application. /Mark David Abers/Today's Date: 2018 Jun. 1.

If there are any contradictions or inconsistencies in language between this application and one or more of the cases that have been incorporated by reference that might affect the interpretation of the claims in this case, the claims in this case should be interpreted to be consistent with the language in this case.

FEDERALLY SPONSORED RESEARCH

Not Applicable.

SEQUENCE LISTING

Not Applicable.

RELATED APPLICATION DATA

Int. Cl: B64G1/28; F03G3/08; B64G1/409; F03G3/06; F03G7/10; F16H27/04; G01C19/02; Y10T74/1225.
U.S. Cl: 74/84S; 244/165; 244/171.5; 74/5.37; 74/84R.

Field of Classification Search

74/5.37; 74/84R; 74/84S; 244/165; 244/171.5; B64G1/28; B64G1/409; F03G3/06; F03G3/08; F03G7/10; F16H27/04; G01C19/02; Y10T74/1225.

Should I personally receive any financial profits from this invention I do hereby dedicate the totality of said profits to be used for religious and/or humanitarian purposes (according to my choosing).

BACKGROUND OF THE INVENTION

1. Field of the Invention

Various terms are defined in the following specification. For convenience, a Glossary of Terms is provided herein, in the end portion of the specification section.

This invention incorporates the methodology of strategic damping as applied to inertial thrusters. To avoid misunderstanding, this document will consider the terms "inertial-propulsion drive," and "inertial thruster" as substantially synonymous. Inertial thrusters are theoretically based on the dual-configuration concept wherein the reactive stroke (maximized-thrust phase, 212) provides forward thrust while the nonreactive stroke (minimized-thrust phase, 211) creates zero or minimal reverse thrust. The present invention relates to the design and operation of an inertial thruster that does not require any reactive engagement with a supporting surface or fluid medium and that uses damping to redirect torque-induced precession. This invention is concerned with an architecture 300 in which precession is damped, redirected and/or interfered with in such a way that the precessable mass 14 can be exploited to create unidirectional motion. For the purposes of this invention, this inertial-propulsion device will be called a Multiple Torques Inertial Thruster (MUTINT).

2. Description of Related Art

It appears to be a tradition for inertial-thruster patents to begin with a treatment of Newton's third law of motion. Newton's law states that every action (singular) has an equal and opposite reaction. The popular conception of the word "action" is often poorly defined and therefore misunderstood. I will give an example of a commonly accepted "action" that does does have an apparent equal and opposite reaction. When a figure skater begins a spin, his or her arms are often extended and resultantly the rotational speed is minimal. However, when the skater performs the action of pulling his or her arms inwardly then instantly that action "causes" the rotational speed to increase dramatically in the exact same direction as the slower spin. The results of the "action" of drawing in one's arms would appear to be distinct from the resulting action. It is common knowledge that the increase in the skater's rotational speed in this scenario is due to the conservation of angular momentum however that does not negate that the interpretation of the word "action" can have a different range of meanings than is normally accepted. Said different range of meanings has special relevance in the area of gyroscopic precession where, as in figure skating, inertial factors can be easily tampered with.

It is commonly known that the initial torque induced upon a spinning rotor causes precession. This original precession is described by the Second Law of Gyrodynamics. Said law relates to the effect on one of the gyro's axes when an attempt is made to change its direction on any of it's three axes. In a given gyro, where the axis of spin is horizontal (axis X), an external torque on axis Y will cause precession not about axis Y but on axis Z. (See FIG. 6A.) Hence $\omega_p$ (precessional-angular velocity) rotates about an axis that is perpendicular to the spin-axis of the rotor and the axis on which torque is applied. The generic formula for precession is given by the equation $\omega_p = m a_g r / I_s \omega_s$ (FIG. 6D) where "$\omega_p$" is the angular velocity of precession (precession rate), "$I_s$" is the moment of inertia, "$\omega_s$" is the angular velocity of the rotor's spin about the spin axis, "m" is the mass creating the torque, "$a_g$" is the acceleration due to gravity and "r" is the perpendicular distance of the spin axis about the axis of precession. Thus, an accelerating mass "m" applied to the axis of a spinning rotor ($\omega_s$) having a rotational inertia ($I_s$) causes precession ($\omega_p$). (However, in this invention the "$a_g$" i.e. gravity-induced acceleration, is substituted with a generic acceleration "a" that is induced by an actuator, locking device, or motor of a torquing system.

Referring back to the hurrying and delaying of precession, what is not as well known is that the initial precession of a spinning rotor can be diverted or redirected by as much as 90 degrees. Although not well known, nonetheless, this redirection or deflection of precessional torque is well documented. Some of the earlier observations are in the context of the oscillations (nutations) of a spinning top. In 1911, Edwin Barton wrote of positive and negative torques that can be induced upon an original precession. Said positive and negative torques can also be called the the hurrying or retarding (delaying) of the precession. As a more indepth explanation of hurrying and delaying effects Barton said that if precession is slowed or prevented in a gyroscope that a spinning top (gyroscope) would fall over. However, if the precession was made to go more quickly (hurried) that the spinning top (gyroscope) would rise (pp. 274-275). This is in accordance with the old saying "Hurry the precession, the top (gyroscope) rises. Retard (delay) the precession, the top (gyroscope) falls." (Crabtree, p. 47). This "hurrying" (or delaying/retarding/resisting) of the top (or gyroscope) has two variations: hurrying/delaying torque or "turning effect." (NOTE: Later references use both terms interchangeably as will also this disclosure.) Crabtree explains that the "hurrying" torque (or delaying torque) produces only a small hurrying (or delaying) effect on the precession but the "turning effect" is much more pronounced and raises the top more quickly (p. 63). "Turning effect" is a form of external torque. Ervin Ferry described this external torque in his book published in 1933. He describes a simple procedure that exemplifies the effect of an external torque to achieve the hurrying 262 and delaying 261 of gyroscopic precession. He writes "Attach a small mass to the inner frame (i.e. gimbal) of the gyroscope at the point "m" thereby producing a torque on Axis "Y" as indicated. (See mass "m", FIG. 6A.) Set the gyro-wheel spinning in the direction indicated. Observe that . . . the gyro-axle (precesses) with an angular velocity in the direction represented by "$\omega_p$" (precessional-angular velocity). Push horizontally against the second gyro-frame (i.e. gimbal) with the rubber tip of a lead pencil so that the spin-axle is moved in the direction of its precession. (See hurrying effect "H", FIG. 6B.) Observe that the weighted side of the inner gyro-frame rises. Now push on the second frame (i.e. gimbal) so that the spin-axle is moved in the direction opposite its precession. (See Delaying effect "D", FIG. 6C.) Observe that the weighted side of the inner frame sinks"" (p. 69).

Ferry describes the hurrying and delaying of precession as follows: "When the precessional speed of the axle of a spinning gyro is increased, the gyro is acted upon by an internal torque in opposition to the torque that produces the precession. When the precessional speed of the axle of a spinning gyro is decreased, the gyro is acted upon by an internal torque in the same direction as the torque that produces the precession. When an external torque is applied to the axle of a spinning gyro in the direction of the precession, an internal torque is developed which acts upon the gyro in opposition to the torque that produces the precession. When an external torque is applied to the axle of a spinning gyro in the direction opposite to that of the precession, an internal torque is developed which acts upon the gyro in the same direction as the torque that produces the precession" (Ferry, p. 70). In summary, a hurrying torque applied in the direction of the original precession ($\omega_p$) will damp and redirect the original precession into the opposite direction (180 degrees) of the original torque (or perpendicular to the original precession). Furthermore, a retarding (delaying) torque applied in the opposite direction of the original precession ($\omega_p$) will redirect the original precession into the same direction as the original torque (or perpendicular to the original precession).

Much speculative effort to invent an inertial thruster has gravitated around gyroscopic devices. An inertial thruster of the centrifugal or gyroscopic class uses a reciprocating or revolving mass that is assumed to have more inertia in one direction than the other. In 1998 John Strachan (patent GB8803860D0, withdrawn) and Harvey Fiala in 2008 (patent U.S. Pat. No. 8,066,226B2, active) applied for patents on similar inertial-thrust devices. Especially Fiala's design demonstrated great ingenuity, however it was premised on an at least one faulty assumption. That assumption related to the interrelationship between precession and inertia. Prior art claims to achieve a reduction of inertia based on precession alone without bringing to bear the redirection of precession, damping, or any other such needed modality. Prior art dogmatically asserts that a spinning rotor, in and of itself, will have a reduced level of inertia when precessing. Said assertion does not withstand experimental rigor. All things being equal, a precessing rotor 14 moving along a curved trajectory has the same reactive thrust as a non-precessing rotor that is being moved along an equivalent trajectory at an equivalent speed. As proof, the author of this invention conducted experiments that both replicated concepts asserted by prior art as well as experiments that involved precessional redirection. The experimental results showed that a precessing rotor 14 will exhibit a diminished level of linear momentum in the minimized-thrust phase only when the precessing mass is subjected to the appropriate form of damping 200. Damping, for the purposes of this invention, is the use of additional external torque to redirect, absorb, and interfere with the original torque-induced precession. Said redirection will be up to 90 degrees of the torque supplied by the hurrying of precession 262 or by the delaying of precession 261. Damping 200, in order to be strategic must involve the hurrying 262 or delaying 261 of precession and must be executed with the correct timing, for the correct duration (brief 251 or prolonged 252), in the correct direction on a three-dimensional scale (hurried 262 or delayed 261), with the correct category (passive 241 or active 242), and with the correct magnitude (damped forcing torque is greater than or less than the applied torque).

This invention is in agreement with the basic concept of dual-phase inertial thrusters: one phase attempts to minimize or lessen the reaction (minimized-thrust phase 211) and the other phase tries to maximize or obtain more of a reaction (maximized-thrust phase, 212). The problem is that the prior art dealing with inertial thrusters does not adequately address the crucial issue of strategic damping 200. Furthermore, the maximized-thrust phase 212 of an inertial thruster, must have a method to displace, in a cyclical fashion, the precessable mass back to a start point in such a way that linear movement is achieved. Prior art attempts at inertial thrust do not adequately describe either a device and/or a method to appropriately incorporate the aforementioned requirements.

SUMMARY OF THE INVENTION

The object of this invention is to disclose an inertial-thrust engine that operates without the aid of gravity and that has at least two distinguishing characteristics. The first distinguishing characteristic is an inertial thrust engine that uses methodological embodiments 200 that strategically damp and/or redirect the direction of a torque-induced precession by a hurrying 262 or delaying 261 of said precession. The second distinguishing characteristic is an inertial-thrust engine that is configured to cyclically displace, in at least two directions, a precessable mass 14 that has undergone or is undergoing the phenomena of precession. I have reviewed hundreds of domestic and foreign patents and patent applications that related to inertial thrust and I have not found any other patent or patent application that credibly presents an architecture combining the methodological criteria of cyclical displacement and strategic damping. The torque of said strategic damping is applied at the correct time of a given configuration, for the required duration (brief 251 or prolonged 252), in the correct direction on a three-dimensional scale (hurrying 262 or delaying 261), with the correct category of damping (active 242 or passive 241), and with the correct magnitude (relatively greater than or less than the torque that induces original precession).

In order to incorporate the aforementioned methods of displacement and strategic damping it is necessary to have a mechanical device that has at least three features. First the engine will need a precessable unit that has a motorized mass that is capable of being precessed (e.g. a motorized spinning rotor 14). Second, the engine will need a powertrain to provide either a damped forcing torque or a damping forcing torque (as needed) during the minimized-thrust 211 and/or maximized-thrust 212 phases. Third, the engine will need a torquing system that serves the dual function of providing a damped forcing torque (to initiate precession) and also to provide a damping torque that can be applied either passively 241 or actively 242 to either hurry 262 or delay 261 the precession. In this disclosure it will be shown how the above three features can be integrated into five different embodiments 100 that operate within the confines of a methodolgical architecture 200. I will describe an integrated architecture 300 that will demonstrate how to apply eleven methodological embodiments of strategic damping 200 within the context of five mechanical embodiments 100.

This invention is the disclosure of discoveries that can be leveraged to achieve inertial thrust when properly integrated with the correct mechanical device along with an appropriate operational method. (I will list three discoveries but others will be described during the course of this disclosure.) Of major significance is that I discovered that inertial thrust can be achieved when the gyro's precession is properly damped or redirected during either the initial onset of precession and/or during the entire minimized-thrust phase 211. The concept of the hurrying 262 or delaying 261 of precession is not new. What is new is that this hurrying or delaying of precession can be used to redirect the inertia of a precessing gyro both when the gyro is stationary as well as when the precessable mass is being displaced in such a way that there is a diminished level of inertia in the direction of movement. Numerous such methods of redirecting precession are discussed during this disclosure. Said redirecting and damping of torque is normally done during phase 1 (called the minimized-thrust phase, 211) but can also be used in phase 2 (maximized-thrust phase, 212).

An additional discovery is that the thrust of phase 2 is enhanced when the equipment is configured to accelerate the connecting arms 29 along with the attached rotors 14. This is in contradistinction to phase 1 (minimized-thrust phase) where constant speed and no acceleration is desirable. I also discovered that thrust can be improved upon during phase 2 by immobilizing the rotation of the central axle 28 & 36. This impedance of the central axle 28 & 36 immediately negates gyroscopic effects and enhances the return of the precessable mass 14 to the start position.

I will now describe several advantages of this inertial-thrust engine. As has already been mentioned, one of the critical shortfalls of prior art dealing with gyroscopic inertial thrust is the lack of strategic damping 200 capable of providing a hurrying 262 or delaying 261 torque on the original precession. A precessing rotor 14 normally cause a "jerking" (reverse-thrusting) motion to an inertial thruster as a whole the instant that the spinning rotor 14 is first affected by precession. This initial rearward jerking motion needs to be damped and redirected by one of two techniques: hurrying of precession 262 or delaying of precession 261. Said technique reduces or eliminates the initial rearwards reaction to the precession by redirecting the precession laterally (during phase 1). Operational methods use strategic damping methods 200 wherein the damping forcing torque caused by the pneumatic cylinder 11 (of the torquing system) is combined with braking and/or the damped torque from the rotation of the central motor 1 & 26 so as to provide the desired redirecting of the original torque-induced precession. Said techniques redirect the original precession and thereby reduces or eliminates the reaction to the movement of the connecting arms 29 in the forward movement of the entire engine (in any of the five embodiments 100).

Besides short falls in the area of redirected precession there are numerous other areas in prior art that can also be changed or improved upon. One such area is the acceleration of the precessable mass 14 (as well as of any attached passive mass) while in the maximized-thrust phase 212. The minimized-thrust phase 211 of an inertial thruster 100 should have a steady, constant speed. On the other hand, the maximized-thrust phase 212 should be, as much as possible, in a state of constant acceleration. Prior art does not exploit the fact that the ratio of angular rate of change between the connecting arm 29 and the central axis relatively increases when moved in one direction and relatively decreases when moving in the other. An illustration of this concept is the scissor jack that we use on our cars to change a flat tire. When the jack is fully extended and the vehicle is at its maximum distance from the ground you notice that it takes several rotations of the central screw to make an even minimal difference on lowering the car. In contrast, when the car is halfway down then several rotations of the jack handle noticeably drops the elevation of the vehicle. Thus, in one direction the rotation-to-elevation ratio increases (accelerates) and in the other direction it decelerates. By applying this concept to this invention, the most advantageous direction of movement is diametrically opposed to the direction of prior art (a 180-degree change). More particularly, in the Pivot 151 and Flex 152 MUTINTE embodiments (FIGS. 1A through 2C), the varying wedge (or triangular) shape created by the push-pull rod 30, and the connecting arms 29 makes for a more rapid acceleration in one direction, when the air valve 27 is in the open or "out" position, as compared to the other direction (when the air valve is in the closed or "in" position). The same is true for the Spring MUTINT embodiment 153 (FIG. 3A), the varying wedge shape created by the central axle 28 & 36, and the connecting arms 29 makes for a more rapid acceleration in one direction as compared to the other direction. This difference of accelerational rates enhances inertial-thrust.

Another novel area of change is the forced cessation of the axle's torque-induced precession during the maximized-thrust phase 212. Normal precessional effects, during the maximized-thrust phase, resist the accelerational rate of the connecting arms 29 and therefore can detract from the amount of thrust achieved during said phase 212. A spinning rotor 14 that is not allowed to precess does not resist movement. In FIGS. 1A through 3C, precession is negated when the central axle 28 & 36 is not allowed to rotate (braked) during the maximized-thrust phase 212. Crabtree makes a supporting observation: "(If) the top begins to lean over, the gravity-couple about the edge of support causes it to precess; and if the precession is hindered by a rough surface, the top falls down" (p. 139). Referring to FIG. 6A, he similarly states that if the screw controlling axis "Z" is tightened (to stop the original precession) that the spinning rotor will at once turn over about axis Y'Y (p. 10). This, of course, is also an application of the retarding (delaying) of precession 261 wherein the spinning wheel "turns over" because the original precession has been resisted (by tightening the screw "z") and thereby aligns the new precessional direction with the direction of the original torque (i.e. gravity). (This is depicted in FIG. 6C.) However, this alignment of precession with the original torque during the maximized-thrust phase 212 does NOT decrease inertia in the direction of movement and for this reason this technique is used to maximize thrust during the maximized-thrust phase 212.

A fourth novel area is shock-absorber 12 impact absorption for each connecting arm 29. It is helpful to absorb the impact of unwanted momentum at the end of the maximized-thrust phase 212. The impact of connecting arms 29 against the device can create undesirable rearward movement of the entire inertial-thruster engine. The shock absorber's 12 primary function is to reduce the impact of the connecting arms 29 caused the instant that a given connecting arm 29 reaches the end of its travel.

An area of improvement that is specific to the Pivot 151 and Flex 152 MUTINTs is the use of synchronization links 31 and/or a gear-plate assembly 37 that causes the connecting arms 29 of the MUTINT Engine to pivot or flex in a synchronized fashion. Without said links 31 or without any associated gearing 37, there is the possibility that one connecting arm 29 pivots or flexes more than the other. If one connecting arm were to move further than the other then the entire device could malfunction or "pull" towards one side. The synchronization links 31 and gearing 37 minimize or eliminate such undesirable movement.

An area of improvement that is specific to the Flex MUTINT is the bendable (flexible) characteristic of the flexible connecting arms 35. Said flexible quality provides for both a smoother operation as well a simpler, lighter design.

An area of improvement that is specific to the Spring MUTINT Engine 153 (FIG. 3A) is the use of tension springs 40. Said springs 40 accelerate the connecting arms 29 as they move from the contracted configuration to the extended configuration. The tension spring 40 (in combination with locking mechanisms 38) replaces the pneumatic cylinder 11 and the three-way air valve 27 in other embodiments. Although a single unit's motion would be intermittent, however, it is recommended that multiple units be interconnected on the same platform 16 so as to smooth out intermittent movement thereby creating continuous unidirectional motion.

Previous art does not a disclose credible design for a rotary inertial thrust. This disclose describes two such devices: the Radius MUTINT 154 and the Tangent MUTINT 155. A rotary device improves the overall smoothness and efficiency of operation besides broadening the base for the types of methods that can be used. Other improvements over prior art in this invention include design simplification and critical weight reduction that accommodates the above modifications.

BRIEF DESCRIPTION OF THE DRAWINGS

NOTE: Non-limiting and non-exhaustive depictions, charts, and prior art for the present embodiments are described with reference to the following FIGURES (FIG.). The drawings featured in the figures are for the purpose of illustrating certain convenient embodiments of the present invention and are not to be considered as limitation thereto. Corresponding reference characters indicate corresponding components throughout the several views of the drawings. Skilled artisans will appreciate that elements in the FIGURES are illustrated for simplicity and clarity and have not necessarily been drawn to scale. Also, common but well-understood elements that are useful or necessary in a feasible embodiment are often not depicted in order to facilitate a less obstructed view of these various embodiments. Dot-dash lines in certain figures is indicative of a feature or device that is either optional or is not central to the operation of that embodiment.

FIG. 6D is an example of an illustrative mathematical formula, from prior art, depicting one of the methods used to calculate gyroscopic precession.

DETAILED DESCRIPTION OF THE INVENTION

Figure 1A:
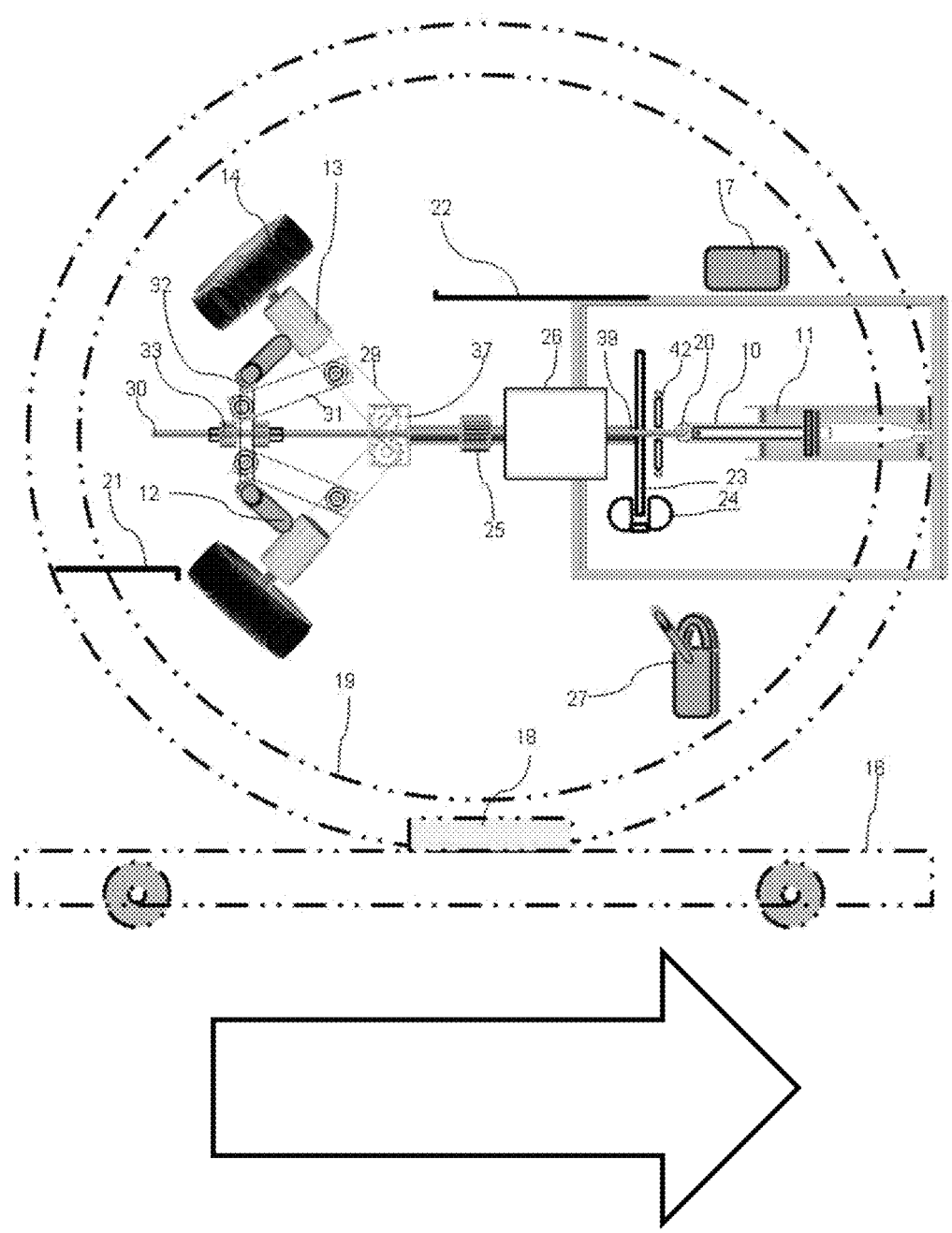
FIG. 1A displays a side view of the Pivot MUTINT Engine 151 in accordance with one or more illustrative embodiments of the present invention with the pivot connecting arms 29 in the contracted configuration.
Figure 1B:
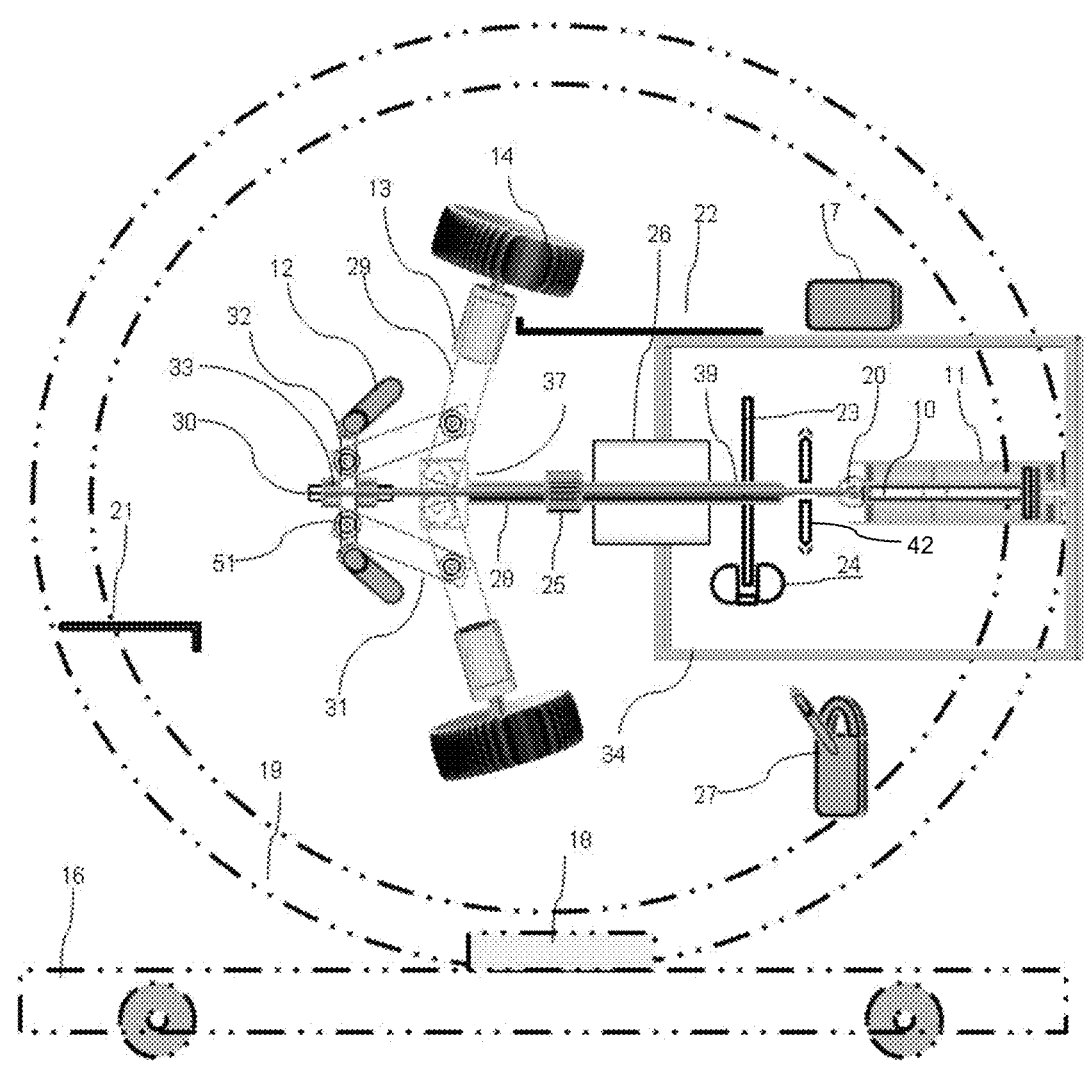
FIG. 1B displays a side view of the Pivot MUTINT Engine 151 in accordance with one or more illustrative embodiments of the present invention with the pivot connecting arms 29 in the extended configuration.
Figure 1C:
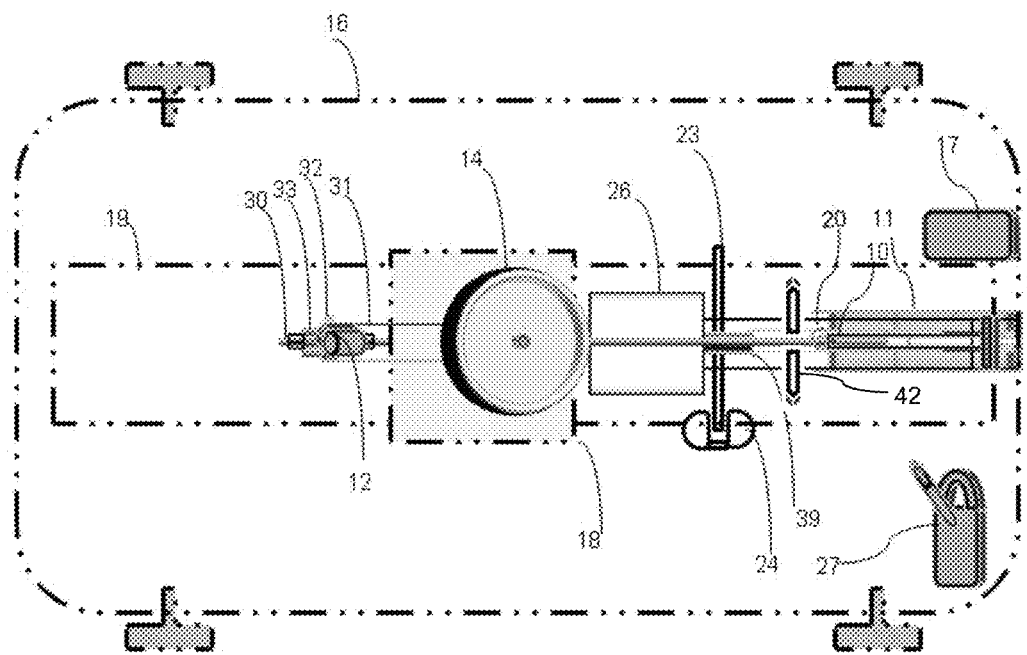
FIG. 1C displays a top view of the Pivot MUTINT Engine 151 in accordance with one or more illustrative embodiments of the present invention with the pivot connecting arms 29 in the extended configuration.
Figure 1C:
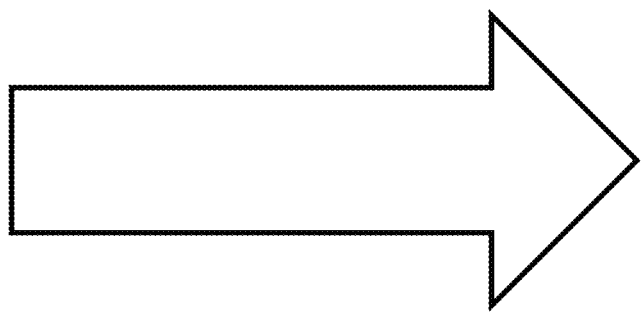

While this invention is susceptible to embodiments in many different forms, there is shown in the drawings and will herein be described in detail specific embodiments, with the under standing that the present disclosure of such embodiments is to be considered as an example of the principles and not intended to limit the invention to the specific embodiments shown and described. In the description below, like reference numerals are used to describe the same, similar or corresponding parts in several views of the drawings. This description describes embodiments in order for those skilled in the art to practice the invention. The glossary (in the end portion of the specification section) defines the meaning of terms used herein.

In FIGS. 1A through 2C we have the Pivot MUTINT 151 and the Flex MUTINT 152 embodiments. In said embodiments, a variable-speed, non-geared, hollow-shaft motor 26 is mounted onto a rotatable frame 19. Said variable-speed motor 1 will be referred to as "central motor." The central motor 26 is mounted onto the rotatable frame 19 by means of a motor-support frame 34. Said rotatable frame 19 is termed "optional" since the focus of this invention is to create an inertial-thruster engine that can be installed on any inertial propulsion vehicle. NOTE: The "non-geared" trait of this central motor 26 allows the motor to continue spinning or "wind milling" even after power has been removed. The term "wind milling" is being used to signify the rotation of the axle due to both gyroscopic precession and to the continued "glide" of angular velocity even after the causational factor of the gyroscopic precession has ceased. (Certain of the methods, especially those of the active damping category, are benefited by the wind-milling trait that can be better exploited by use of a non-geared motor.) The rotatable frame 19 can be mounted to a mobile platform (16; also optional) by means of a clamp 18. Said rotatable frame 19 allows the operator to "point" the MUTINT Engine and create thrust in any direction (vertically, horizontally, or diagonally). A brake disk 23 and brake calipers 24 are attached to the motor shaft 39 of the central motor 26 or on the central axle 28. If the engine shaft 39 does not extend out sufficiently then said shaft 39 can be connected to a hollow central axle 28 by use of a shaft connector 25. One end of the connecting arm 29 is attached to the axle 28 in such a way that the connecting arm 29 can pivot between the gear plates (37, as seen in the Pivot MUTINT embodiment 151) or in such a way that the flexible connecting arm 35 can bend freely. Said connecting arms are firmly attached to said hollow central axle 28 by gear plates (37, in the Pivot MUTINT embodiment 151) or an axle bracket (15, in the Flex MUTINT embodiment 152). The other end of the connecting arm 29 & 35 is attached to the rotor motor 13. All attachments to said axle 28 will be made in such a way that the apparatus is evenly weighted when orbited (revolved). In order to ensure that the connecting arms 29 & 35 contract and extend uniformly, it is recommended that synchronization gears 37 be attached (see Pivot MUTINT 151 embodiment) on the end of the connecting arms 29 that are in closest proximity to the axle 28. In said Pivot MUTINT embodiment 151, the gears will mesh with each other on the axle-end of the connecting arms 29 in such a way that both connecting arms 29 move back and forth (rise and fall) in a nearly uniform fashion. On the Flex MUTINT embodiment 152, the synchronization links 31 will assist in obtaining uniform movement. Passing through the middle of the hollow central-motor shaft 39 and the hollow central axle 28 is the adjustable push-pull rod 30. On one end of said rod 30 is a bar collar 32 that is retained by a push-pull-rod bearing 33 on either side of said collar 32. Said bearings 33 will allow the push-pull rod 30 to remain stationary while the bar collar 32 and all that is attached to it orbit around it. Connected diagonally between each connecting arm 29 & 35 and each bar of the bar collar 32 is a synchronization link 31. Attached to each end of the bar collar 32 is a shock absorber 12. NOTE: Said shock absorber 12 can be placed in any appropriate location so long as it meets the criteria of being in a position to absorb the shock (impact, momentum) of the rotor motors 13 and rotors 14 as they finish their range of travel at the end of a given phase. Placed between the end of the push-pull rod 30 and the motor-support frame 34 is a variable-acceleration, double-acting, duplex pneumatic cylinder 11 (hereafter called "pneumatic cylinder"). Said cylinder 11 is part of the torquing system and, as such, provides tension, pressure, and/or torque to assist the connecting arms 29 & 35 to extend or contract when said cylinder 11 is activated. The piston rod 3 that reciprocates within the cylinder 11 is connected to the push-pull rod 30 by means of a swivel connector 20. Should the MUTINT Engine be automated, sensors 21 & 22 can be used. These contraction 21 and extension 22 sensors are multiple and adjustable and can be placed in any location deemed helpful to provide feedback on movement status and rate. Said sensors 21 & 22 assist by sending signals to any or all motors, air valves, and brakes to signal when and to what degree they should be activated or deactivated.

Figure 3A:
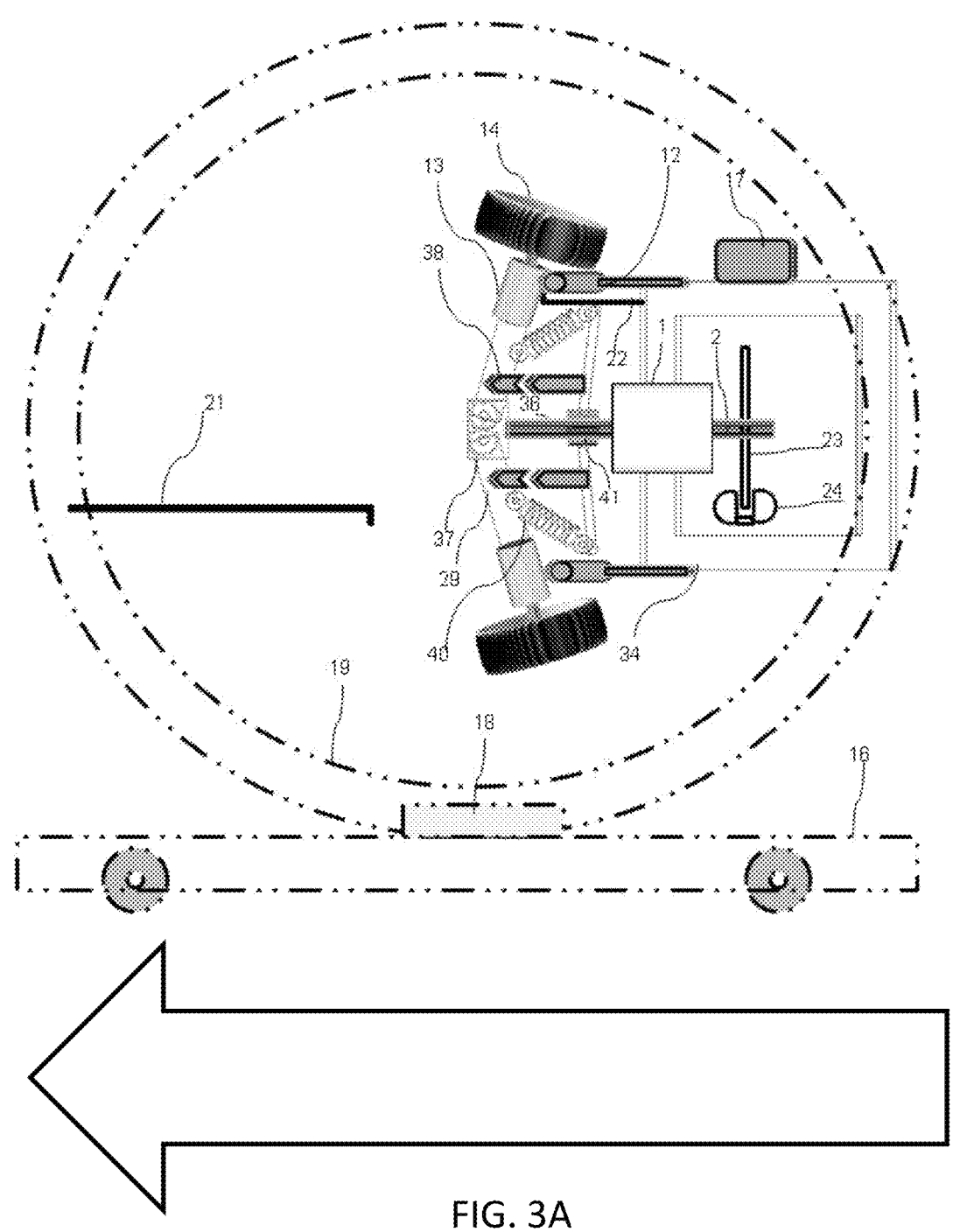
FIG. 3A displays a side view of the Spring MUTINT Engine 153 in accordance with one or more illustrative embodiments of the present invention with the pivot connecting arms 29 in the extended configuration.
Figure 3B:
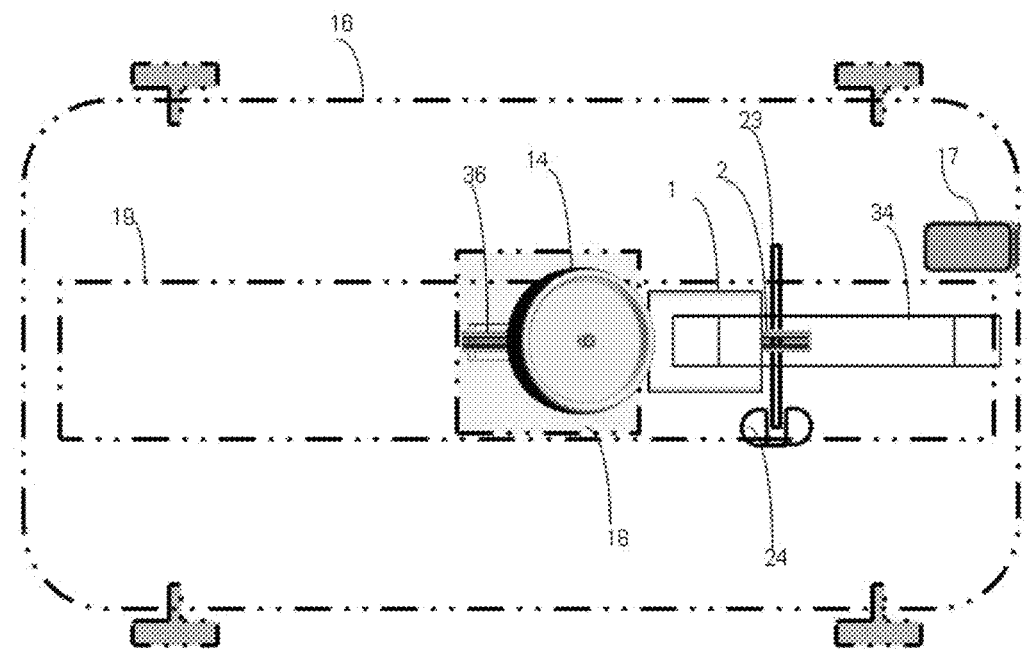
FIG. 3B displays a top view of the Spring MUTINT Engine 153 in accordance with one or more illustrative embodiments of the present invention with the pivot connecting arms 29 in the extended configuration.
Figure 3C:
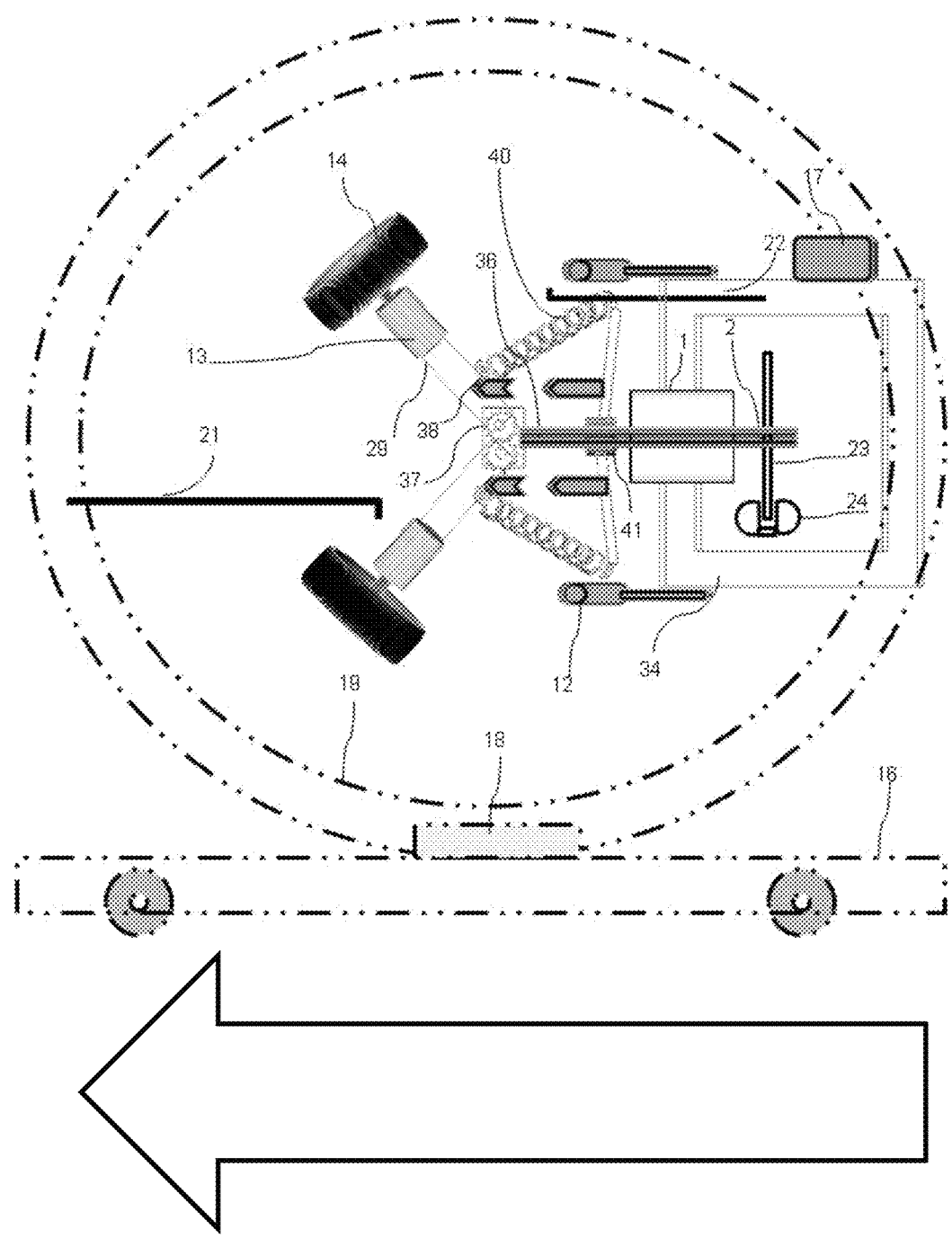
FIG. 3C displays a side view of the Spring MUTINT Engine 153 in accordance with one or more illustrative embodiments of the present invention with the pivot connecting arms 29 in the contracted configuration.

In FIG. 3A we have the Spring-MUTINT 153 embodiment. The central motor 1 of the Spring MUTINT is mounted onto an optional rotatable frame 19 by means of a motor-support frame 34. The rotatable frame 19 can be mounted to an optional mobile platform 16 by means of a clamp 18. A brake disk 23 and brake calipers 24 are attached to the shaft 2 of the central motor 1. The brake calipers 24 can be activated manually or automatically in conjunction with the switching off of the central motor 1. The central-motor shaft 2 of the central motor 1 is connected to a solid central axle 36 by use of the shaft-connector-extension bars 41. One end of the pivot arm 29 is attached to the solid central axle 36 in such a way that the arm can hinge between the plates on the gear-plate assembly 37 that are firmly attached to the solid central axle 36. The other end of said connecting arm 29 is attached to a rotor motor 13 and rotor 14 unit. All attachments to said axle 36 will be made in such a way that the apparatus is evenly weighted when orbited.

Stretched between each protruding bar of the shaft connector 41 and each rotor motor 13 (or on any suitable location on the connecting arm) is a tension spring 40. (A "bar" in this context refers to a rod-like extension that protrudes from the shaft connector.) Said bar will serve to retain the tension spring. Should automation be used then the needed contraction 21 and extension 22 sensors should be of an adjustable nature. Said sensors assist by sending signals to any or all motors to signal when they should be stopped, slowed, or accelerated. Attached to the motor-support frame 34 (or to any other appropriate location) are shock absorbers 12 with their appropriate brackets. Said shock absorbers 12 should be so mounted so that the connecting arms 29 strike the rotor motor housing (or any other suitable place on the connecting arm 29) when the connecting arms 29 reach the end of their travel.

Figure 4A:
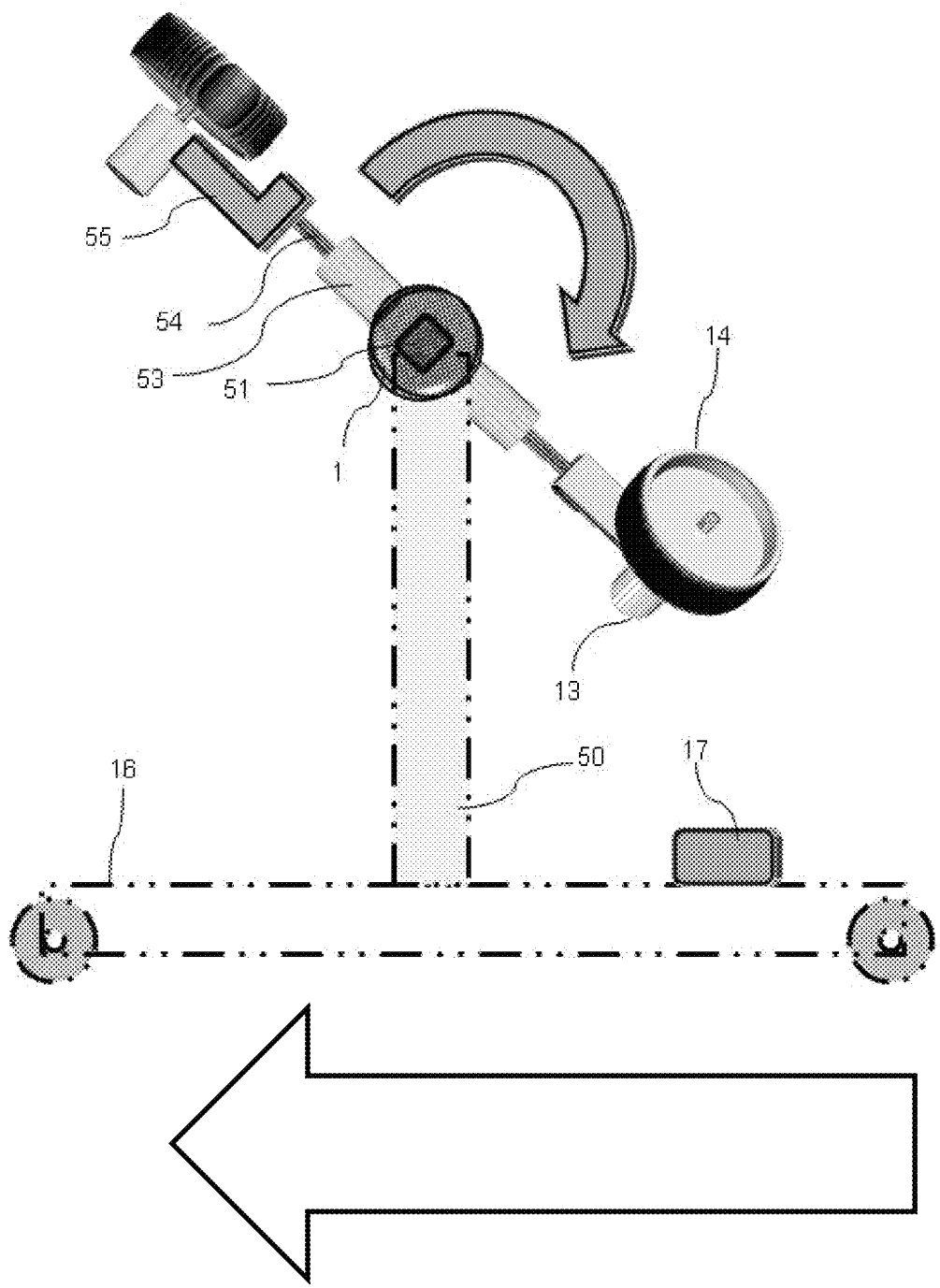
FIG. 4A displays a side view of the Radius MUTINT Engine 154 in accordance with one or more illustrative embodiments of the present invention with the rotors 14 in illustrative positions.
Figure 4B:
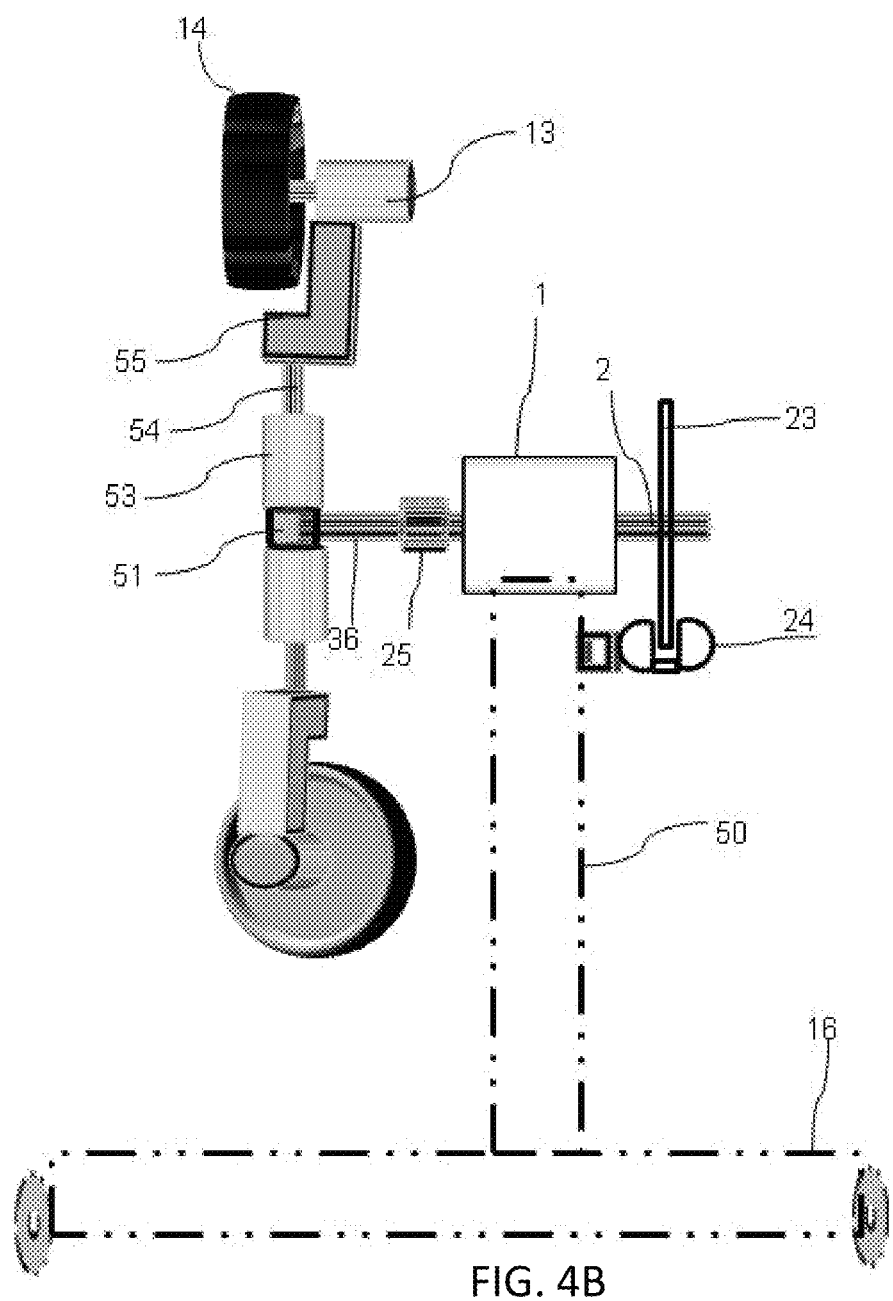
FIG. 4B displays a front view of the Radius MUTINT Engine 154 in accordance with one or more illustrative embodiments of the present invention with the rotors 14 in illustrative positions.

In FIGS. 4A and 4B we have the Radius-MUTINT embodiment 154. The central motor 1 of the Radius MUTINT 154 is mounted onto an optional vertical frame 50. Said frame 50 can be mounted onto an optional mobile platform 16. A brake disk 23 and brake calipers 24 are attached to the shaft 2 of the central motor 1. The central-motor shaft 2 of the central motor 1 is connected to a solid central axle 36 by use of a shaft connector 25. The central-axle mounting brackets 51 are secured to the central axle 36. The gimbal step motors 53 are attached to the mounting brackets 51. The step motor shaft 54 is secured to the portion of the gimbal 55 that is closest to the central axle 36. The rotor motor 13 with its rotor 14 is attached to the far end of the gimbal 55. Where desired, an automation unit 17 will guide the smooth functioning of the radius MUTINT embodiment 154.

Figure 5A:
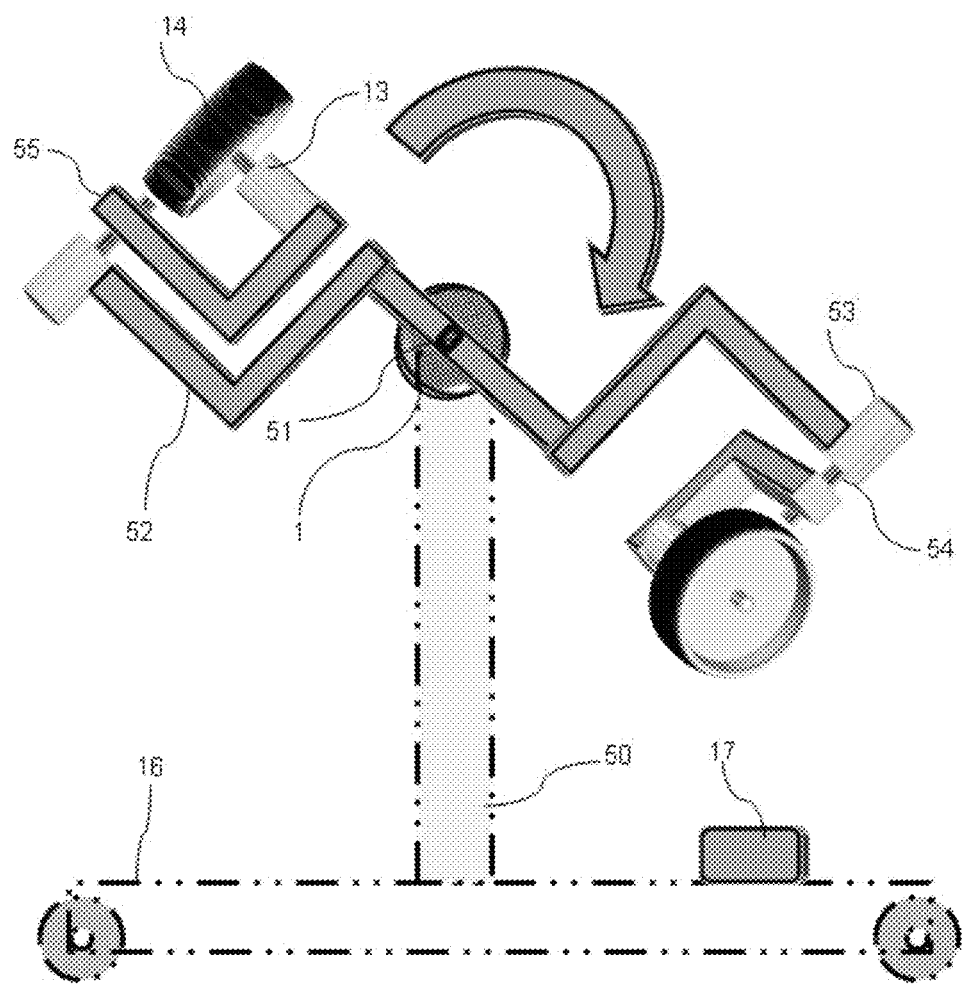
FIG. 5A displays a side view of the Tangent MUTINT Engine 155 in accordance with one or more illustrative embodiments of the present invention with the rotors 14 in illustrative positions.
Figure 5A:
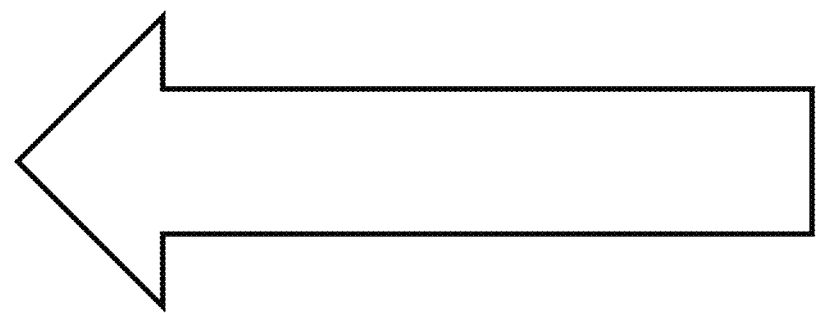
Figure 5B:
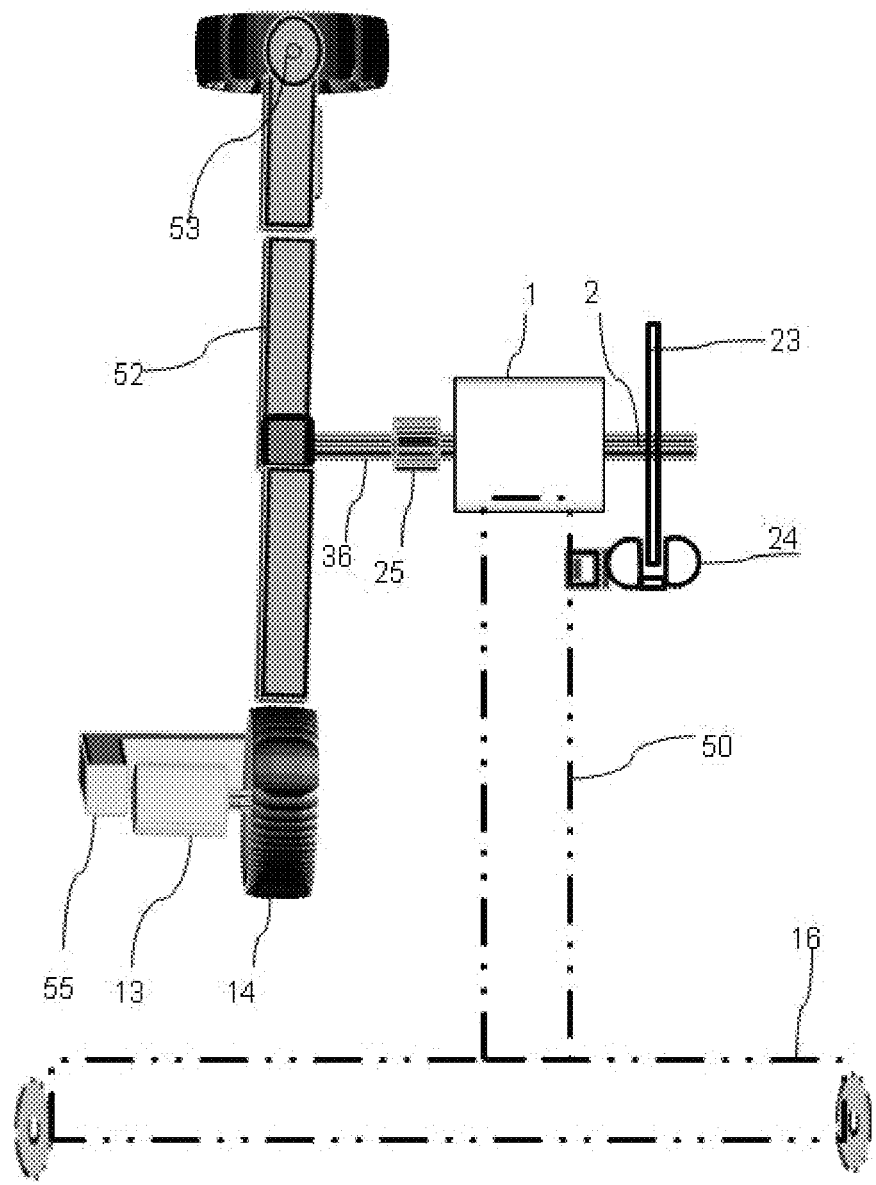
FIG. 5B displays a front view of the Tangent MUTINT Engine 155 in accordance with one or more illustrative embodiments of the present invention with the rotors 14 in illustrative positions.
Figure 6A:
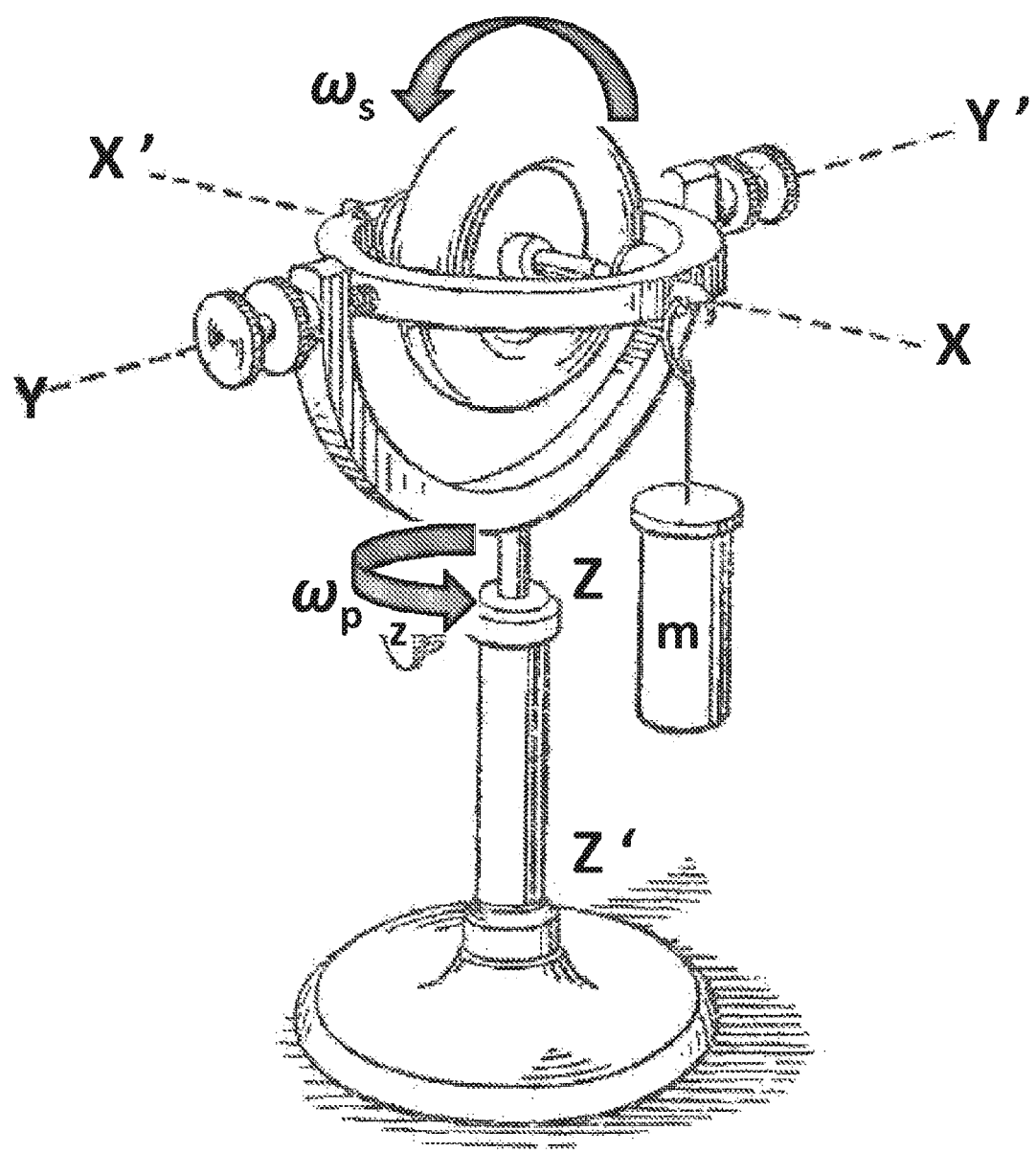
FIG. 6A is a depiction of a gyroscope from prior art that is being subjected to a downwards torque and thereby inducing (original) precession.
Figure 6B:
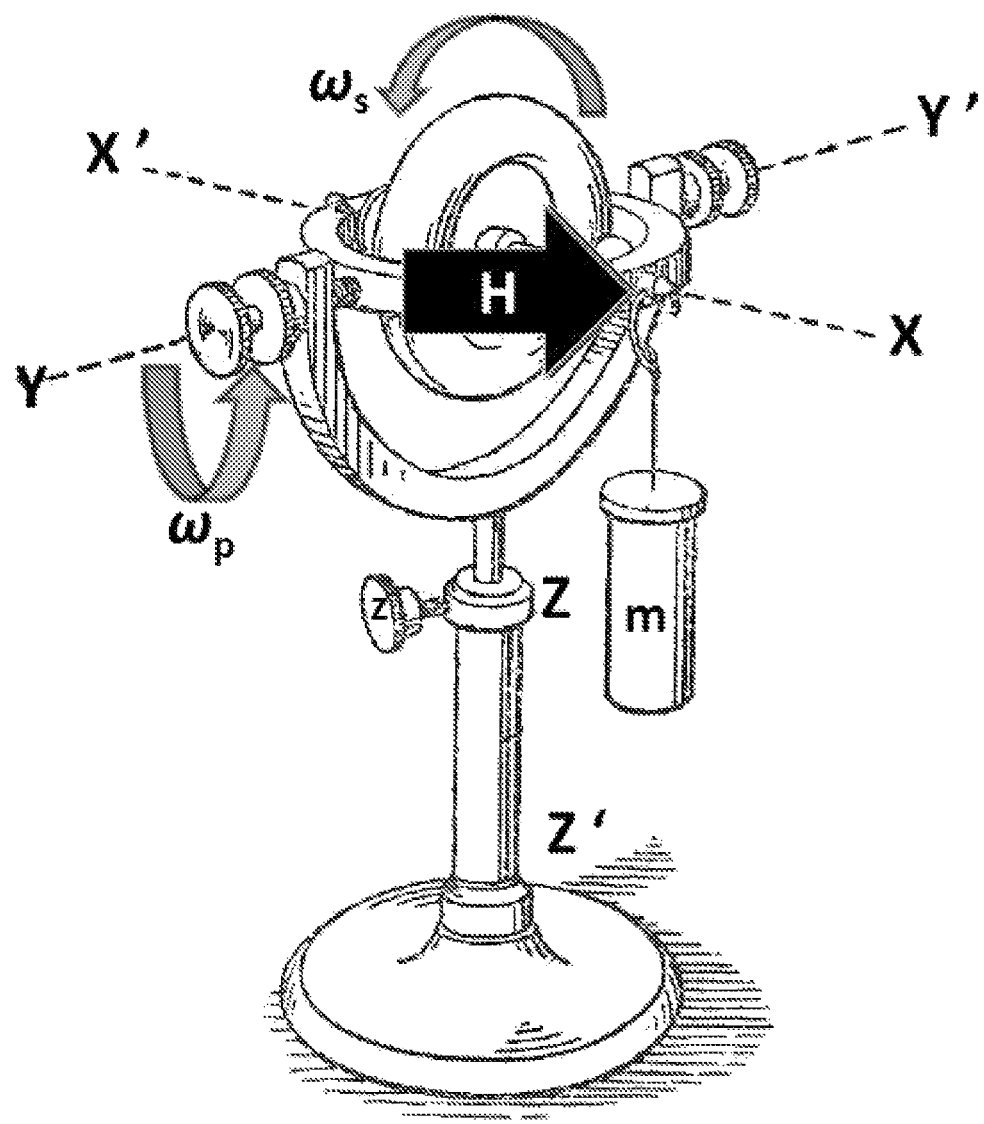
FIG. 6B is a depiction of a gyroscope from prior art with a precession that has been redirected by the hurrying 262 of the original precession.
Figure 6C:
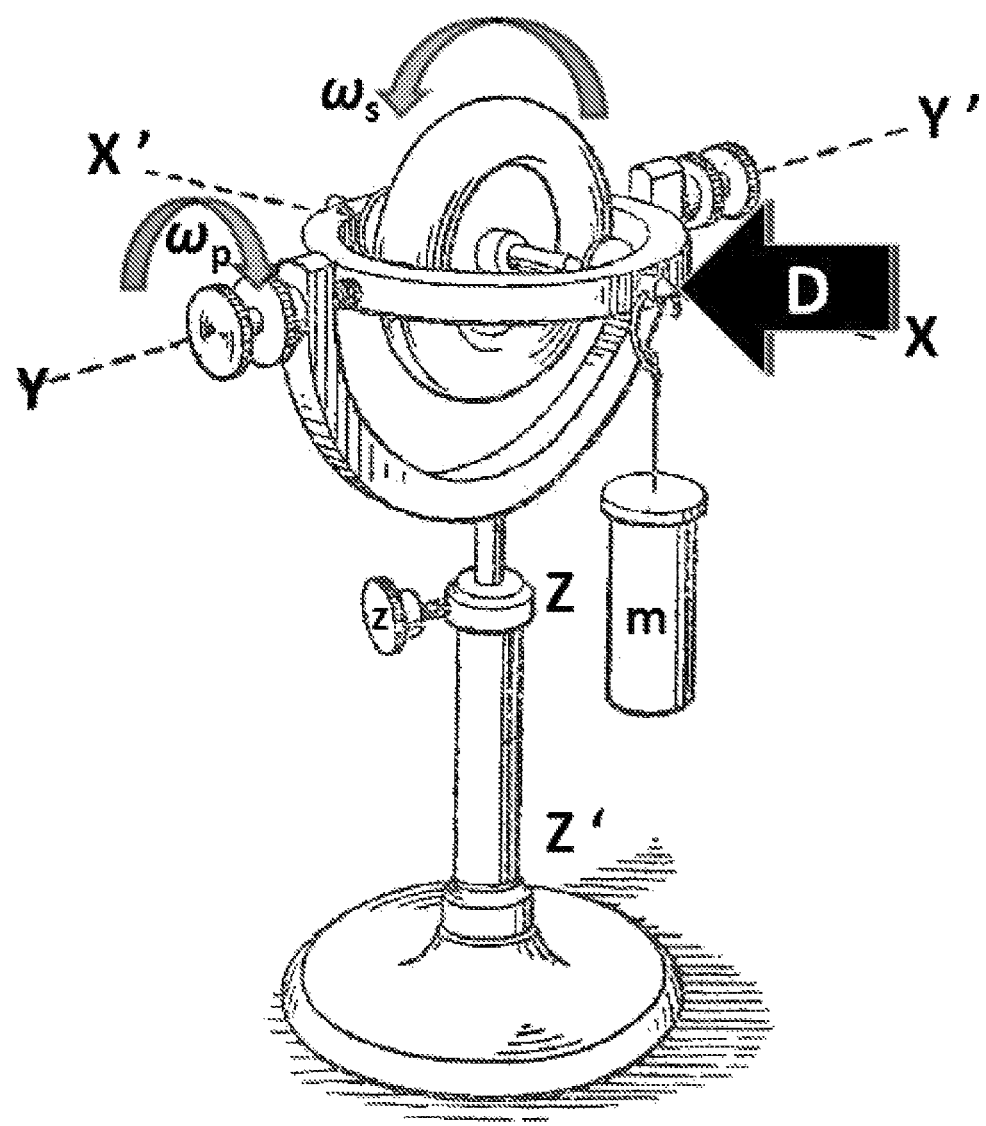
FIG. 6C is a depiction of a gyroscope from prior art with a precession that has been redirected by the delaying 261 of the original precession.
Figure 7:
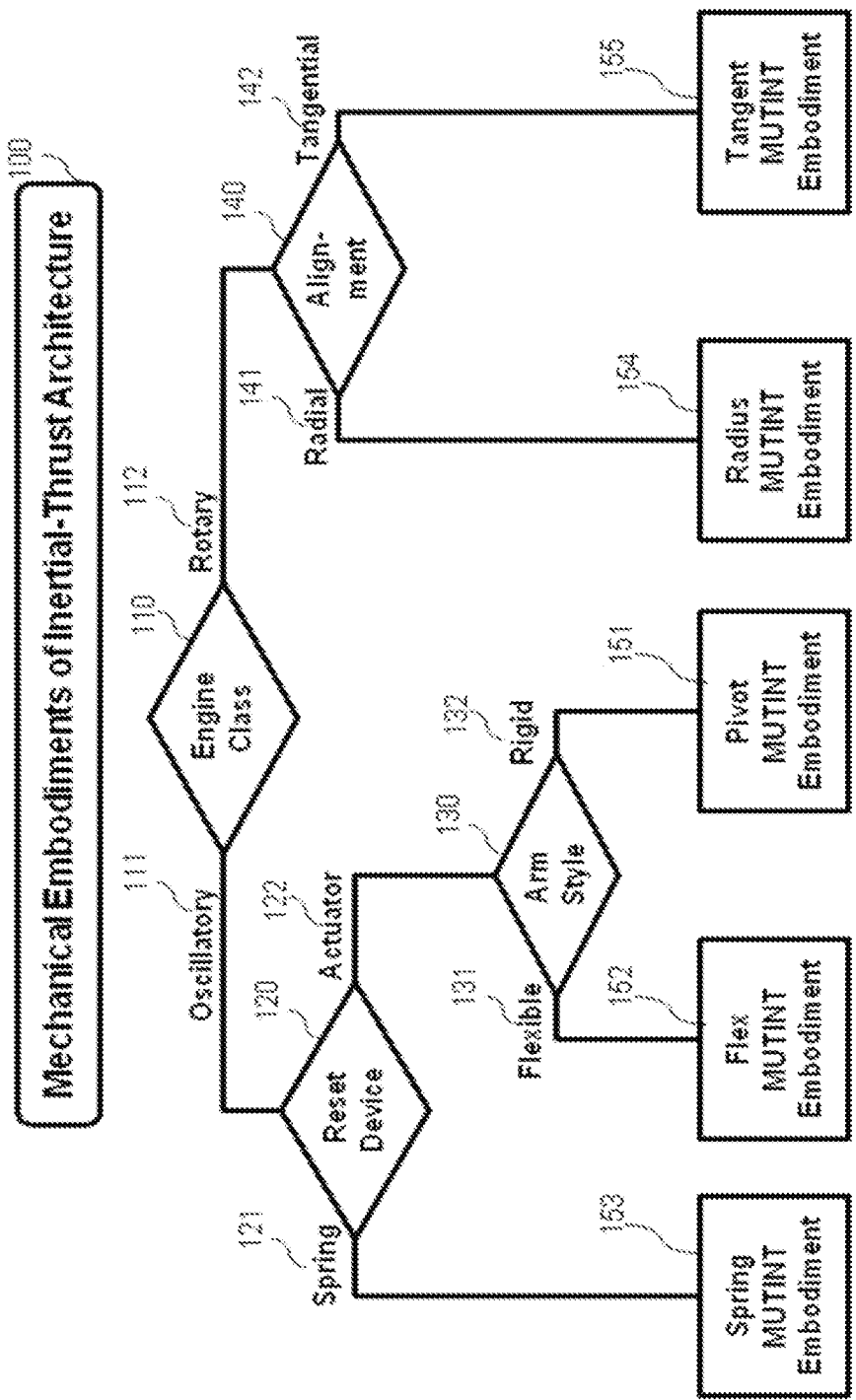
FIG. 7 is a chart depicting the inter-relationship of various illustrative mechanical embodiments of the Inertial-Thrust Architecture 100 in accordance with one or more illustrative embodiments of the present invention.

In FIGS. 5A and 5B we have the Tangent-MUTINT embodiment 155. The central motor 1 of the Tangent MUTINT 155 is mounted onto an optional vertical frame 50. Said frame 50 can be mounted onto an optional mobile platform 16. A brake disk 23 and brake calipers 24 are attached to the shaft 2 of the central motor 1. The central-motor shaft 2 of the central motor 1 is connected to a solid central axle 36 by means of a shaft connector 25. The central-axle mounting bracket 51 is secured to the central axle 36. The rotating subframe 52 is centered and attached to said mounting bracket 51 on the axle 36. The motor end of the gimbal step motors 53 are attached close to each outer extremity of said subframe 52. Said step motors' shafts 54 are affixed to their respective gimbals 55 in such a way that the gimbal pivots laterally when the step motor is activated. The rotor motors 13 with their rotors 14 are mounted to the opposite end of the gimbal 55. As desired, an automation unit 17 will guide the smooth functioning of the Tangent MUTINT embodiment 155.

REFERENCE NUMERALS

1. Central motor. NOTE: Other drive devices in lieu of the central motor 1 are also acceptable. Examples include, but are not limited to, fuel-powered, air-powered, gear-driven, flywheel, and air turbine. A brakeable motor or a motor with a worm-gear transmission could be used to replace the both the central motor 1 & 26 as well as its associated brake components (calipers; 24 and disk; 23) especially when passive damping methods are being used. Furthermore, should it prove difficult to use a motor that is in line with the central axle 36 then another option is to install a pulley or sprocket on a supported axle and then power said axle by placing a belt or chain to connect the pulley or chain with the central motor 1.
2. Central-motor shaft.
3. Piston rod.
11. Variable-acceleration, double-acting, duplex pneumatic actuator. NOTE: Other types of actuators in lieu of the said pneumatic actuator are also viable. Examples include but are not limited to variable-acceleration double-acting telescopic pneumatic cylinder, electric magnet, geared track, hydraulic cylinder, coil springs (in combination with a locking mechanism 38), or standard pneumatic actuators with a variable speed control. A method of achieving variable acceleration with standard pneumatic cylinders is the technique of "stacking" cylinders. If two or more cylinders are connected end-to-end then the end result will provide for an ever-increasing acceleration when all cylinders are activated simultaneously. If only two cylinders are "stacked" then one will create the equivalent what is called a duplex cylinder. Regardless of the method used, the objective is the same: an actuator stroke that can be accelerated while being retracted or pushed a outwardly.
12. Shock absorber.
13. Rotor motor. NOTE: Other drive devices in lieu of the electric rotor motor are also acceptable. Examples include, but are not limited to, fuel-powered, air-powered, gear-driven, flywheel, and pneumatic turbine.
14. Precessable mass, such as a spinnable rotor, vibrating structure gyroscope, or seismic mass.
15. Axle bracket.
16. Mobile platform with wheels or on a floatation device. (Platform is optional in the event that only the MUTINT Engine is mounted on a vehicle.)
17. Programmable-Automation Module.
18. Frame clamp. (Optional in the event that only the MUTINT Engine is mounted on a vehicle).
19. Rotatable frame. (Optional in the event that only the MUTINT Engine is mounted on a vehicle).
20. Swivel connector: NOTE: A bearing, pin, bushing, hinge, or some other comparable device can be used in lieu of the swivel connector.
21. Adjustable-contraction sensor.
22. Adjustable-extension sensor.
23. Brake disk.
24. Brake calipers.
25. Shaft connector.
26. Hollow-shaft motor (AKA "central motor").
NOTE: Other drive devices in lieu of an electric central motor are also acceptable. See number 1 above.
27. Three-way air valve.
28. Hollow central axle. Said axle 28 will be supported by bearings, bearing housing, and supporting structure on both ends. (Not shown.)
29. Pivot connecting arm.
30. Adjustable push-pull rod. NOTE: If a pneumatic turbine or any other air-powered device is used to power the rotors 14 then said rod 30 should be hollow to allow for air pressurization of the shaft and thereby supply power to the pneumatic turbines 13.
31. Synchronization link.
32. Bar collar (Push-pull rod collar with bars). NOTE: Said "bars" in this context refers to a plate, lug, rod or similar protrusion to which the synchronization links 31 and shock absorbers 12 can be mounted or attached.
33. Push-pull rod bearing.
34. Motor-support frame.
35. Flexible connecting arm.

36. Solid central axle. Said axle will be supported by bearings, bearing housing, and supporting structure on both ends (not shown).
37. Gear-plate assembly.
38. Locking mechanism (device).
39. Central-motor shaft.
40. Tension spring. Other items may substitute the spring such as a stretchable band or a mechanical actuator.
41. Shaft connector with spring-extension bars. NOTE: A "bar" in this context refers to a rod-like or bar-like extension that is protrudes from the shaft connector 41. Said bar will serve to retain the spring 40.
42. Push-pull rod braking mechanism.
50. Vertical frame (optional).
51. Central-shaft mounting brackets.
52. Rotating subframe.
53. Gimbal step motor.
54. Gimbal motor shaft.
55. Gimbal.
100. Mechanical embodiments of Inertial-Thrust Architecture.
110. MUTINT engine class whether rotary or oscillatory.
111. Oscillatory MUTINT engine class.
112. Rotary MUTINT engine class.
120. Reset device whether by spring or by an actuator.
121. Spring reset device.
122. Actuator reset device.
130. Connecting arm style whether flexible or rigid.
131. Flexible connecting arm style.
132. Rigid connecting arm style.
140. Rotor alignment whether radial or tangential.
141. Radial rotor alignment.
142. Tangential rotor alignment.
151. Pivot MUTINT engine.
152. Flex MUTINT engine.
153. Spring MUTINT engine.
154. Radius MUTINT engine.
155. Tangent MUTINT engine.
160. Phase 1 configuration for oscillatory MUTINTs whether contracted or extended configuration.
161. Phase 1 configuration is the contracted configuration.
162. Phase 1 configuration is the extended configuration.
170. Damping options.
200. Strategic-Damping Methodological Embodiments of Inertial-Thrust Architecture.
210. Inertial Thruster Phases whether minimized-thrust or maximized-thrust.
211. Minimized-thrust phase (Phase 1).
212. Maximized-thrust phase (Phase 2).
220. Inertial thruster modes whether unimodal or bimodal.
221. Unimodal mode.
222. Bimodal mode.
230. Inertial thruster phase order whether distinct or overlapping.
231. Distinct phase order.
232. Overlapping phase order.
240. Damping categories whether passive or active.
241. Passive damping (category).
242. Active damping (category).
250. Torque duration categories whether brief or prolonged.
251. Brief torque duration for the hurrying or delaying of precession.
252. Prolonged torque duration for the hurrying or delaying of precession (duration).
260. Torque direction categories whether delaying or hurrying.
261. Delaying (i.e. resisting) of precession (torque direction).
262. Hurrying of precession (torque direction).
281. Method I: Oscillatory-Brief-Passive-Delaying Method.
282. Method II: Oscillatory-Contracted-Overlapping-Brief-Passive-Delaying Method.
283. Method III: Oscillatory-Prolonged-Passive-Delaying Method.
284. Method IV: Oscillatory-Prolonged-Active-Delaying Method.
285. Method V: Oscillatory-Prolonged-Active-Hurrying Method.
286. Method VI: Oscillatory-Extended-Brief-Passive-Delaying Method.
287. Method VII: Oscillatory-Extended-Overlapping-Brief-Passive-Delaying Method.
288. Method VIII: Unimodal-Rotary-Active-Prolonged-.Method.
289. Method IXa: Bimodal-Rotary-Active-Prolonged Method.
290. Method IXb: Variant-Bimodal-Rotary-Active-Prolonged Method.
291. Method X: Prolonged-Passive-Delaying Method.
292. Method XI: No-Damping Method.
300. Integrated Architecture of mechanical and methological embodiments of inertial-thrust.

Operation

Figure 8:
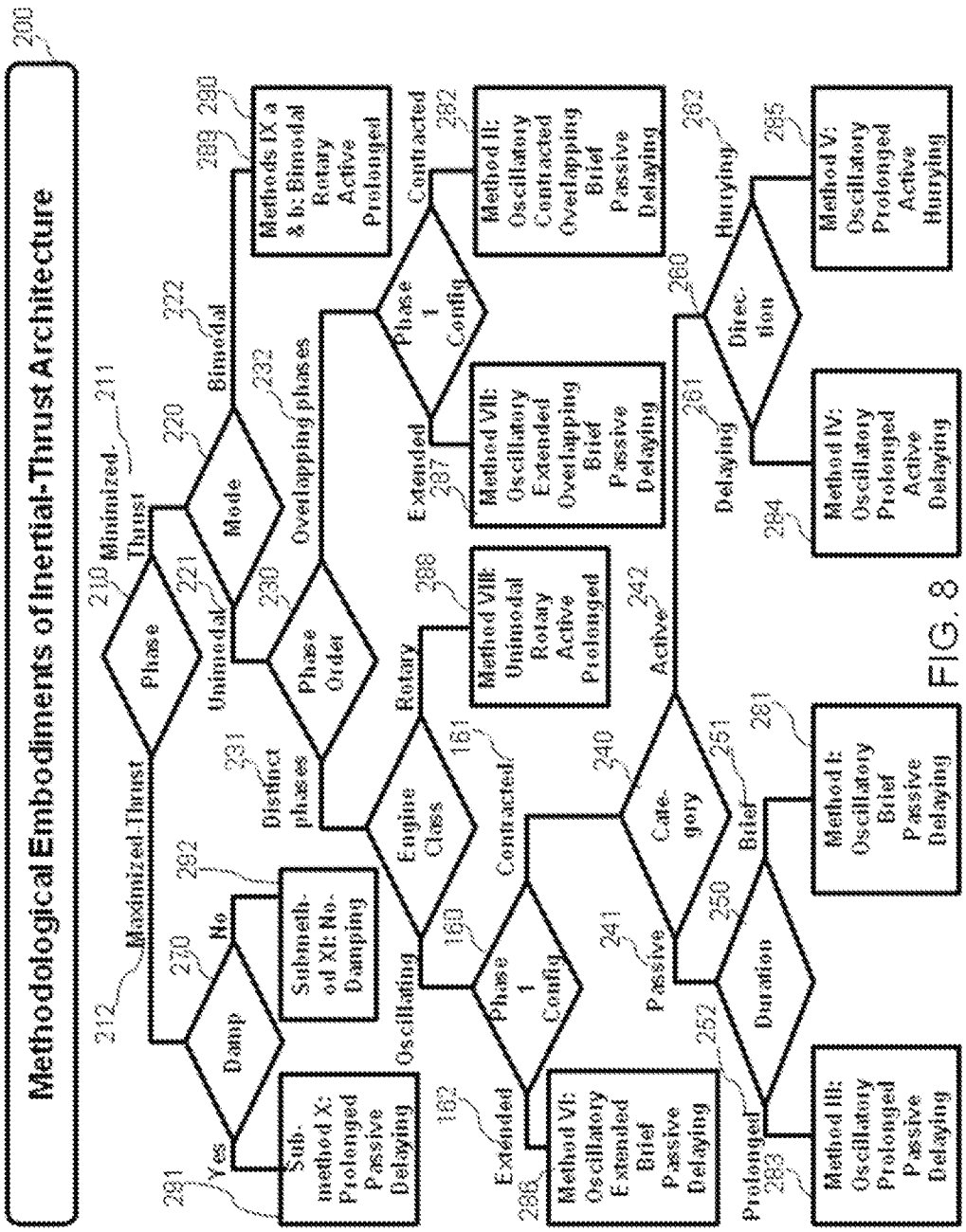
FIG. 8 is a chart depicting the various Strategic Damping Methods and their inter-relationship with Methodological Embodiments of the Inertial-Thrust Architecture 200 in accordance with one or more illustrative embodiments of the present invention.
Figure 9:
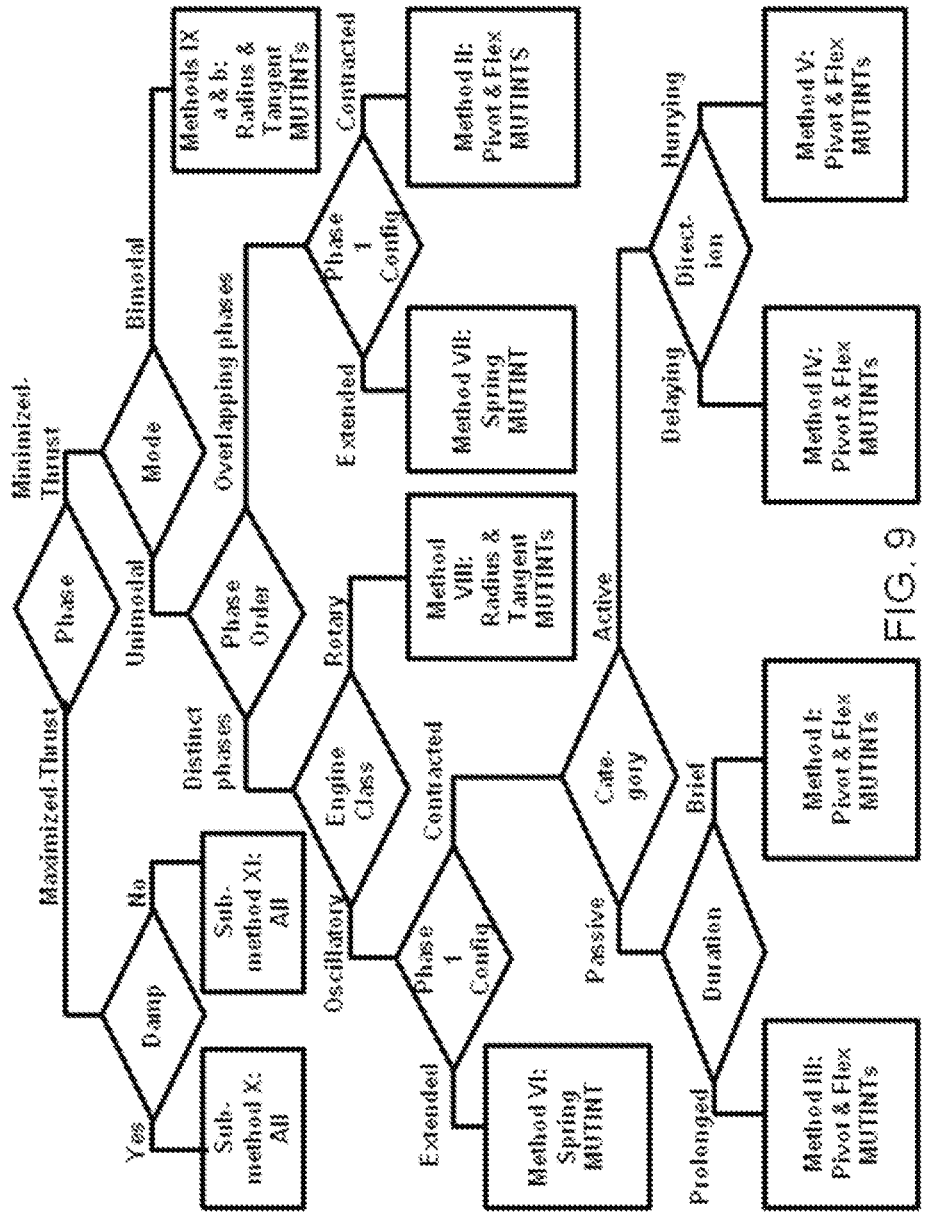
FIG. 9 is a chart depicting the Integrated Architecture of the various illustrative Mechanical and Methodological Embodiments 300 in accordance with one or more illustrative embodiments of the present invention.

I will present a total of ten inertial-thrust methods 200 to include two submethods 291 & 292 The ninth method has two variations (IXa & IXb) and the tenth method comprises Submethod X and Submethod XI). (See FIG. 8.) During phase 2 of the following ten methods 200, the MUTINT Engine, as a whole, will move in the opposite direction of the displacement of the affected rotor(s) 14. In general, for the oscillatory MUTINTs 111 (FIGS. 1A through 3C) the damped forcing torque is provided by the central motor 1 & 26 and the damping forcing torque is provided by the actuator 11 (or by the locking mechanism 38). In phase 1 of the rotary MUTINTs (FIGS. 4A through 5B) the inverse is true. For the rotary MUTINTs 154 & 155, the damping forcing torque is provided by the central motor 1 and the damped forcing torque is provided by the gimbal step motor 53. Thus, for the oscillatory MUTINTs 111, while the rotors are precessing, the torque produced from the actuator 11 (or locking device 38) must be greater than the torque produced by the central motor 1 & 26. For the rotary MUTINTs 112, while the rotors are precessing, the torque from the central motor 1 must be greater than the torque from the gimbal step motor 53.

First, I will present five methods on how to achieve inertial thrust with the Pivot 151 and Flex 152 MUTINT embodiments. (See methods I through V, 281, 282, 283, 284, & 285.) These two embodiments are presented together since they have certain features in common. (See FIGS. 1A and 2A.) In the next two explanations I will describe two methods on how to achieve inertial thrust with the Spring MUTINT embodiment 153 (See method VI 286 & VII 287, FIG. 3A). The next three explanations deal with rotary MUTINT methods. (See method VIII 288, method IXa 289, and method IXb 290.) The final two explanations are generic submethods for the maximized-thrust phase applicable to all five mechanical embodiments. (See methods X 291 and XI 292)

NOTE: The direction of rotation (CW i.e. clock wise, or CCW i.e. counterclock wise) is taken to mean as seen from the pneumatic cylinder 11 looking towards the direction of the rotors 14. Furthermore, the connecting arms 29 & 35 are in the start position for the Pivot 151 and Flex 152 embodiments when said arms are contracted 161 and diagonal (or nearly parallel) to the axle 28. For the the Spring MUTINT 153, the start position is when the connecting arms 29 are extended 162 and nearly perpendicular to the axle 28.

Operational Method I 281 (Oscillatory-Brief-Passive-Delaying Method):

Phase 1 of Operational Method I (FIGS. 1A and 2A): The over-arching strategy of this method during phases 1 and 2 is to first produce torque (damped forcing torque) by rotating the axle 28 & 36 (along with the attached arms 29 and rotors 14). Upon being orbited by the central axle 28 & 36, the rotors 14 will immediately have a tendency to precess forwards however this precession is briefly disallowed by a strong countering torque (damping forcing torque) from the pneumatic cylinder 11. This static and passive delaying of the original precession redirects the precessional torque perpendicularly (by up to 90 degrees). This damping action deflects the original precession into the overall direction of motion of the inertial thruster engine. The new precessional torque now coincides with the same direction as the rotation of the central axle 28 & 36 (i.e. CCW). This is a practical application of inducing a delaying torque 261 on the original precession.

More specifically, we have two precessable rotors 14 spinning in a clock-wise (CW) direction about a second axis. The central motor 1 & 26 is set to spin the axle 28 & 36 in a counter-clock wise (CCW) direction about a first axis. All brakes have been released. Before the central motor 1 & 26 is rotated in a CCW direction it is essential that the connecting arms 29 & 35 be forced to stay in the contracted configuration 161 by applying outward air pressure from the pneumatic cylinder 11 or by engaging a locking (gating) device 38 (to immobilize the connecting arms 29 from moving on a third axis). (This delaying torque 261, to prevent a first precessional torque, should be greater than the torque supplied by the central axle's rotation.) External torque (greater forcing torque) is accomplished by placing the pneumatic cylinder's three-way air valve 27 in the open ("out") position. Said external torque of the pneumatic cylinder 11 temporarily damps the precession (first precessional torque) created by the spinning rotors 14. (NOTE: The rotating of the central motor 1 & 26 in a CCW direction on the first axis induces the rotors 14 to have a tendency to swing forwards about the third axis (into the general direction of travel of the engine (see large arrow in FIG. 1A, for example)). The end result will be that the first precessional torque will be redirected to the same direction as the rotation of the central axle 28 & 36 (i.e., CCW). As a result of the redirecting of the first precessional torque, the rotors 14 will temporarily have a lesser reaction during the minimized-thrust phase 211 than during the maximized-thrust phase 212.

After several revolutions of the central motor 1 & 26 and with the central motor still spinning, the air-pressure valve 27 is placed in the neutral position thereby releasing the air pressure and allowing for gyroscopic precession to push the pneumatic cylinder's piston 3 and the connecting arms 29 & 35 forward (into the general direction of travel). The connecting arms 29 & 35 and the associated rotors 14 will swing forward at a basically constant rate of speed. You will observe that this forward movement of the connecting arms 29 & 35 and rotors 14 does not produce an equal and opposite reactive motion on the unit as a whole. NOTE: A given embodiment may require a braking mechanism 42 to be applied on the push-pull rod 30 during the minimized-thrust phase 211 to ensure that the rotors precess in a forward direction at a uniform, resisted rate.

Phase 2 of Operational Method I 291 (FIGS. 1B, 1C, 2B, and 2C): After the connecting arms 29 & 35 are in the extended configuration then the power is switched off from the central motor 1 & 26. At the same time a braking mechanism 24 is applied to the central axle 28 & 36, such as the disk-brake calipers 24 onto the brake disk 23. Immediately afterwards the pneumatic cylinder piston rod 10 is thrust outwardly by placing the air valve 27 in the out ("open") position. The rotor motors 13 (with the attached rotors; 14) will swing backwards at an ever-increasing rate of acceleration and the precession units will strike the shock absorbers 12 at the end of their travel. The rearward swing of the rotors 14 will cause the rest of the MUTINT Engine to move in the opposite direction i.e. forward. The net result is that the MUTINT Engine moves more in a forward direction during phase 2 than it does in a rearward direction during phase 1. Once the connecting arms 29 & 35 return to the contracted configuration 161, the two-phase cycle will then be repeated ad infinitum. NOTE: The "rear" portion Pivot 151 and Flex 152 MUTINT Engine is the end where the rotors 14 are located and the "forward" portion is the end of the MUTINT Engine where the pneumatic actuator 11 is located.

Operational Method II 282 (Oscillatory-Contracted-Overlapping-Brief-Passive-Delaying Method): A variation to Operational Method I would be to alternate quickly between phases 1 and 2 so that the rearward momentum of the precessable mass 14 in phase 2 becomes the equivalent of the delaying torque required for phase 1. In said method, the holding function of the pneumatic cylinder 11 at the beginning of phase 1 would become unnecessary since the momentum from the rearward motion would provide the necessary torque to delay the precession at the beginning of phase 1. Thus, there would be a brief moment where both phases overlap 232 in which phase 1 would begin before phase 2 ends. This method is called a "contracted" method to distinguish it from the same concept being used in the "extended" mode on the spring MUTINT engine in method VII 287 (FIG. 3A).

Operational Method III 283 (Oscillatory-Prolonged-Passive-Delaying Method):

Phase 1 of Operational Method III (FIGS. 1A and 2A): The over-arching strategy of this method during phases 1 and 2 is to produce torque by rotating the axle 28 & 36 so that the attached rotors 14 begin to precess in a forward direction. As soon as precession begins, then this precession is partially resisted (delayed) by either pressure from the pneumatic cylinder 11 or from a braking mechanism 42 such as a friction brake on the push-pull rod 30. This partial resistance of the original precession incrementally redirects the precessional torque laterally to the overall direction of movement. The end result will be that the precessional torque 261 will be redirected into the same direction as the rotation of the central axle 28 & 36 (i.e. CCW).

More specifically, we have two rotors 14 spinning in a CW direction. The central motor 1 & 26 is set to spin the axle 28 & 36 in a CCW direction. The embodiment is in the contracted configuration 161. Any brakes 24 on the central axle 28 & 36 have been released. As the central motor 1 & 26 is rotated in a CCW direction it is essential that the connecting arms 29 & 35 be partially delayed in their forwards trajectory. (Said delaying torque 261 should be less than the torque supplied by the rotation of the central axle 28 & 36.) Resistance or delaying can be accomplished by placing the three-way air valve 27 in a slightly open ("out") position or by lightly applying brakes 42 to the push-pull rod 30 that applies appropriate rearward pressure to the connecting arms. An appropriate resistance to the forward movement of the connecting arms will cause an incremental portion of the original precession to be redirected to a direction that coincides with the central axle's rotation. NOTE: The rotating of the central motor 1 & 26 in a CCW direction induces the rotors 14 to have a tendency to swing forwards (into the general direction of travel). You will observe that this forward movement of the connecting arms 29 & 35 and rotors 14 does not produce an equal and opposite reactive motion on the unit as a whole during the minimized-thrust phase 211.

Phase 2 of Operational Method III 291 is substantially the same as that of phase 2 of Operational Method I. (See above.) NOTE: It is during phase 2 that the actual forward thrust occurs.

Figure 2A:
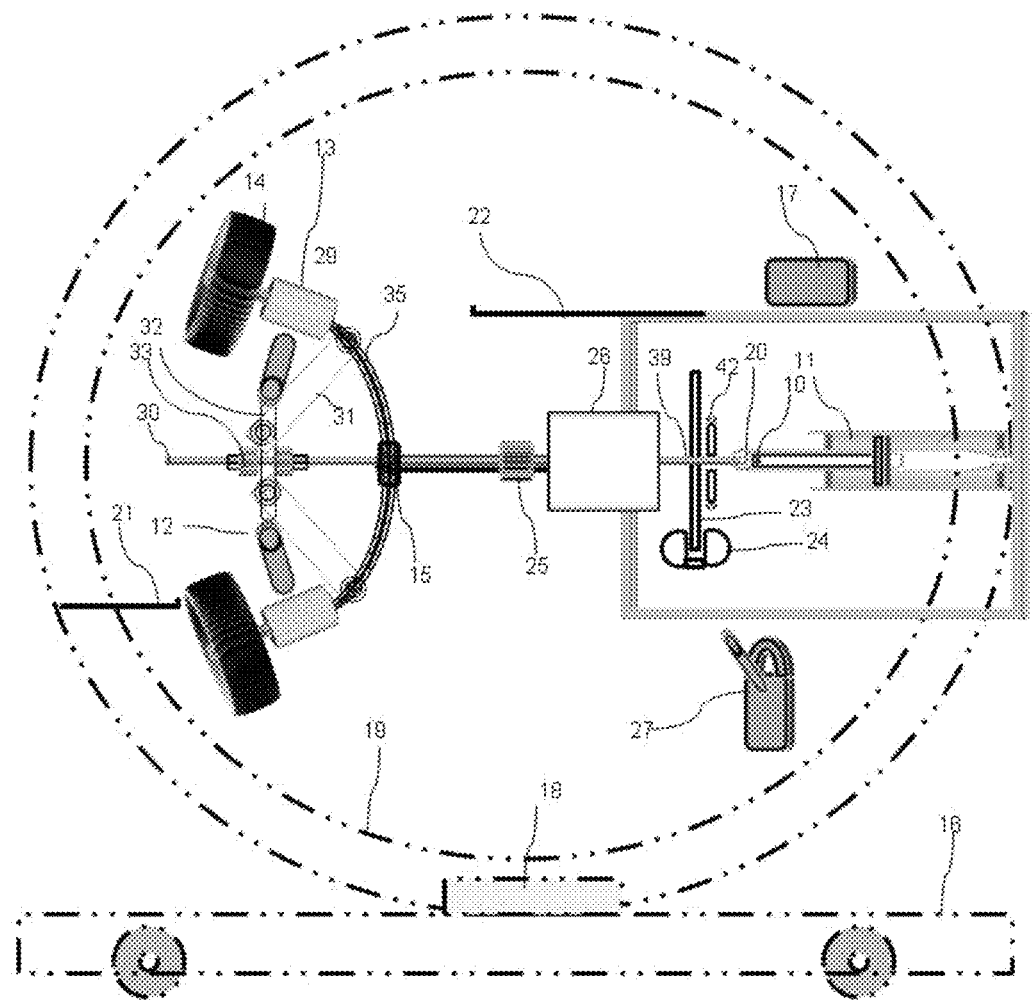
FIG. 2A displays a side view of the Flex MUTINT Engine 152 in accordance with one or more illustrative embodiments of the present invention with the flexible connecting arms 35 in the contracted configuration.
Figure 2B:
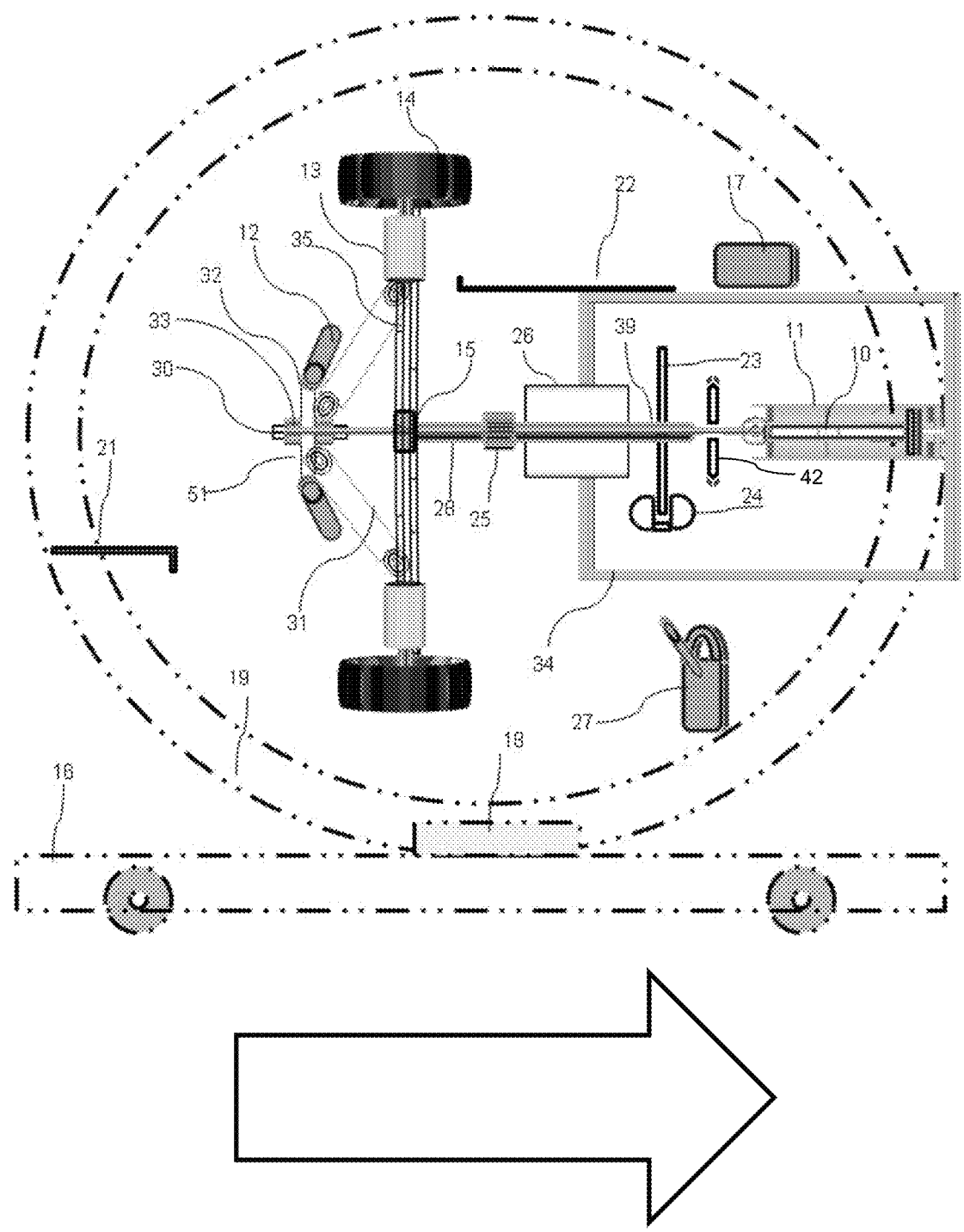
FIG. 2B displays a side view of the Flex MUTINT Engine 152 in accordance with one or more illustrative embodiments of the present invention with the flexible connecting arms 35 in the extended configuration.
Figure 2C:
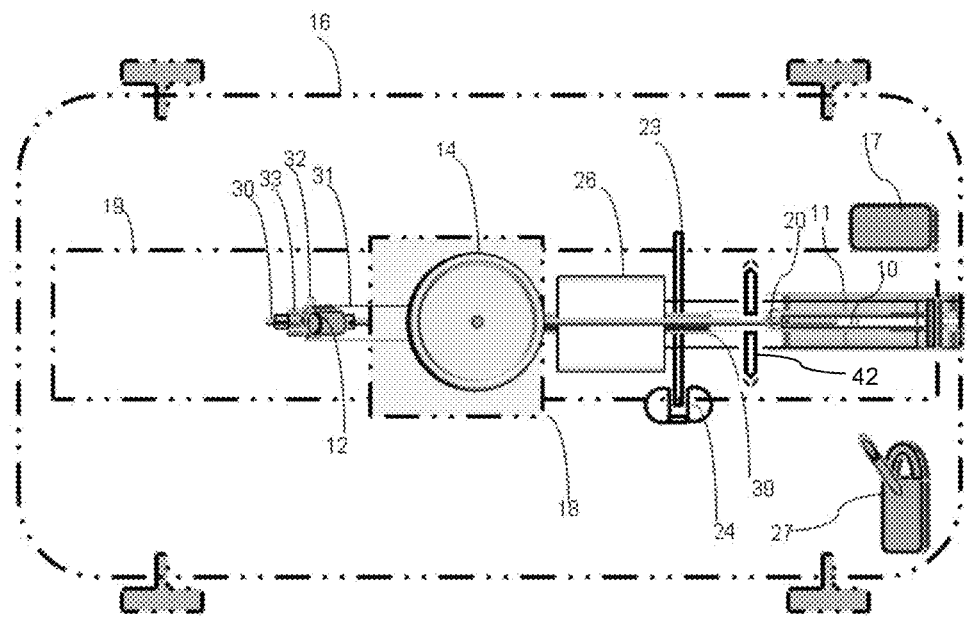
FIG. 2C displays a top view of the Flex MUTINT Engine 152 in accordance with one or more illustrative embodiments of the present invention with the flexible connecting arms 35 in the extended configuration.
Figure 2C:
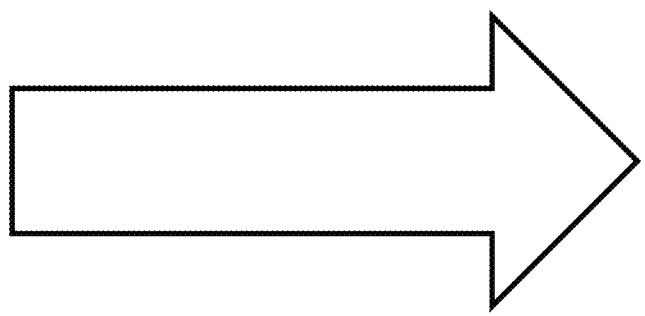

Operational Method IV 284 (Oscillatory-Prolonged-Active-Delaying Method):

Phase 1 of Operational Method IV (FIGS. 1A and 2A): The over-arching strategy of this method during phases 1 and 2 is to create a net forward motion by using an active delaying technique 261 that will redirect the original precession into the same direction as the central axle's rotation. The start position for this method is the contracted configuration 161 (FIGS. 1A and 2A). As this phase begins there are two rotors 14 spinning in a CW direction. With all brakes released, first place the air valve 27 on "out" (or "neutral" position). (NOTE: the neutral position is also acceptable since the original precession will already be torquing the connecting arms 29 rearward.) Now begin to rotate the central axle 28 & 36 in a CW direction. After the central axle's rotation has attained its full speed then switch the air valve 27 to the "in" position. The forward movement of the connecting arms 29 will immediately place an active delaying torque 261 on the original rearward precession. In this set up, when the piston rod 10 of the pneumatic actuator 11 pulls inwardly then the resulting gyroscopic precession causes the arms 29 to have a tendency to rotate in a CW direction. Said direction coincides with the existent CW rotation of the central axle 28 & 36. Thus, the delaying torque is conveniently redirected or diverted in a direction that is perpendicular to the overall direction of movement and thereby minimizing (or eliminating) any thrust parallel in the direction of movement. This is a practical application of inducing a delaying torque 261 on the original precession.

Phase 2 of Operational Method IV 291 is substantially the same as phase 2 of Operational Method I. (See above.) NOTE: It is during phase 2 that the actual forward thrust occurs.

Operational Method V 285 (Oscillatory-Prolonged-Active-Hurrying Method):

Phase 1 of Operational Method V (FIGS. 1A and 2A). The over-arching strategy of this method during phases 1 and 2 is to create a net forward motion by actively hurrying the precession 262 of the rotors 14 during phase 1.

First induce precession by rotating the central axle 28 & 36 in a CCW direction. This will cause the rotors 14 to precess forwards. At this point the pneumatic cylinder 11 is pulled in causing the rotors 14 to move forward even more quickly. This hurrying of the original precession 262 redirects the precession in such a way that the new precession now counters the rotational direction of the central axle 28 & 36. Thus, the new direction of the precessional torque will be CW and in the opposite direction of the central axle's CCW rotation. What is most significant is that the precessional torque has now been redirected to being perpendicular to the overall movement of the inertial thruster.

More specifically, phase 1 begins with two rotors 14 spinning in a CW direction. The start position for phase 1 is with the connecting arms 29 & 35 in the contracted configuration 161. With all brakes released, first place the air valve 27 on "out" and then begin to rotate the central axle 28 & 36 in a CCW direction. After the central axle's rotation has attained its full speed then switch the air valve 27 to the "in" position. The forced forward movement of the connecting arms 29 will place a hurrying torque 262 on the original precession. In this set up, when the piston rod 10 of the pneumatic actuator 11 pulls inwardly then the resulting gyroscopic precession causes the arms 29 to rotate in a CW direction. (The torque supplied by the pneumatic cylinder 11 should be greater than the torque supplied by the central axle's rotation.) Said direction is in opposition to the CCW rotation of the central axle 28 & 36. Thus, the hurrying torque 262 is conveniently redirected in a direction that is perpendicular to the general direction of movement thereby minimizing (or eliminating) any thrust parallel to the direction of movement.

Phase 2 of Operational Method V 291 is substantially the same as phase 2 of Operational Method I. (See above.) NOTE: It is during phase 2 that the actual forward thrust occurs.

Operational Method VI 286 (Oscillatory-Extended-Brief-Passive-Delaying Method):

Phase 1 of Operational Method VI (FIG. 3A): The Spring MUTINT embodiment 153 is different from the Pivot 151 and Flex 152 MUTINT embodiments in that the start position for the Spring MUTINT is in the extended configuration 162. The over-arching strategy of this method during phases 1 and 2 is to first induce precession by orbiting the rotors 14 in a CW direction. This method employs a Spring MUTINT Engine 153 wherein gyroscopic precession, (after a brief resistance 251, by the locking mechanism 38) stretches the springs 40 and moves the connecting arms 29 towards the contracted configuration 161. (See FIG. 3C.) In phase 2, once the central motor 1 is braked and immobilized then the tension springs 40, and since the forcing torque is removed, the connecting arms 29 automatically move back to the extended configuration.

More specifically, in phase 1 we have two rotors 14 spinning in a CW direction. The axle brake 24 has been released. In this operational method, the central motor 1 is set to spin the axle 36 in a CW direction. The start position in this method is with the connecting arms 29 & 35 in the extended configuration 162. Before the central motor 1 is rotated in a CW direction it is essential that the connecting arms 29 be restrained or locked in the extended position by activating the locking device 38 and thereby temporarily neutralizing the original precession. This static delaying 261 of the original precession redirects the precessional torque perpendicularly (up to 90 degrees) to coincide with the overall direction of motion of the inertial thruster engine. While the connecting arms 29 are swinging away from the central motor 1 they are simultaneously stretching the tension springs 40. You will observe that this movement of the connecting arms 29 does not produce an equal and opposite reaction of the unit as a whole in the direction of travel.

Phase 2 of Method VI 291 (FIGS. 3B and 3C): After the connecting arms 29 are in the contracted configuration then the power is turned off from the central motor 1 and the disk brake calipers 24 are immediately applied to the brake disk 23 thereby stopping the central axle 36 from rotating. With the assistance of the diagonal tension springs 40 the connecting arms 29 (with the attached motors 13 and rotors 14) will now swing back towards the central motor 1 at an ever-increasing rate of acceleration and the precession unit will strike the shock absorbers 12. The swing of the rotors 14 will cause the rest of the MUTINT Engine to move in the opposite direction. The net result is that the MUTINT Engine moves more in one direction during phase 2 than it does in the other direction during phase 1. Once the connecting arms 29 have returned to the extended configuration, the two phases will repeat ad infinitum. NOTE: The "forward" portion of the Spring MUTINT Engine is the end where the rotors 14 are located and the "rear" portion is the end of the MUTINT Engine where the central motor 1 is located. NOTE: An alternate method of operation in phase two would be stop the rotor motors 13 from spinning in lieu of causing the axle 1 to cease rotation by the braking action 24. Phase 1 would then require that the rotor motors 13 be turned on again before proceeding with phase 1.

Operational Method VII 287 (Oscillatory-Extended-Overlapping-Brief-Passive-Delaying Method):

This method uses the Spring MUTINT embodiment 153 which has a net movement in the opposite direction from the Pivot 151 and Spring 152 MUTINT embodiments. A variation to the above Operational Method (See Method VI.) would be to use the same steps as in Method VI but with the modification of quickly alternating between phases 1 and 2 so that the rearward momentum of the spinning rotors 14 in phase 2 becomes the equivalent of the braking required for phase 1. In said scenario the locking mechanism 38 would not be needed since the momentum from the rearward motion would provide the necessary torque to resist (delay) 261 the precession at the beginning of phase 1. Thus, there would be an instant where both phases overlap 232 in which phase 1 would begin before phase 2 ends.

Operational Method VIII 288 (Unimodal-Rotary-Active-Prolonged Method):

Phase 1 of Operational Method VIII (FIGS. 4A and 5A). NOTE: For the previous oscillatory MUTINT embodiments 111 the damped forcing torque is produced by the central motor 1 on a first axis and the damping forcing torque is produced by the actuator 11 (or the locking device 38) on a third axis. In phase 1 for the rotary MUTINTs 112, the inverse is true: the damping forcing torque is produced by the central motor 1 on the third axis and the damped forcing torque on the first axis is produced by the gimbal step motor(s) 53. Thus, in phase 1 for the rotary MUTINTs 112, while the spinning rotor 14 on the second axis is being precessed, the torque of a given gimbal step motor 53 on said first axis must be less than that of the central motor 1 on said third axis.

The over-arching strategy of method VIII is to redirect the original precession (first precessional torque) perpendicularly during the minimized-thrust phase 211 and then redirect it (second precessional torque) again to be parallel to the direction of movement in the maximized-thrust phase 212. In phase 1, the rotating of the central motor 1 (with the attached rotors 14) n said third axis and the lateral pivoting action of said rotors 14 on said first axis induces a hurrying of the original precession 262. (Since there are a plurality of rotors 14 and since a hurrying of precession 262 redirects the original precession by up to 90 degrees, then part of the engine will be constantly undergoing the minimized-thrust phase 211 and part of the engine will be constantly undergoing the maximized-thrust phase 212.) For simplicity of explanation, we will use the face of a watch as a reference (in a scenario where horizontal inertial thrust is desired). The explanation for operational method VIII will only discuss one of the rotors 14 (rotor 1) since the same will be done for the other rotor(s) as it passes a given "o'clock" position. Phase 1 for rotor 1 begins at the 3 o'clock position and continues in a CW direction to the 9 o'clock position. For the purposes of the rotary MUTINT embodiments 112, the gimbal step motor's pivot direction on the first axis (i.e., CW or CCW) is determined as seen from the step motor 53 looking towards the rotor 14.

The minimized-thrust phase 211 begins with the rotor 14 spinning in a CCW direction on said second axis for the radial MUTINT (CW for the Tangent MUTINT) and with the axis of the rotor parallel to the tangent created by the trajectory of orbit on the third axis for the radius MUTINT 154. (If the tangent to the trajectory of the orbit is called the X-axis then the rotor axis will be parallel to the X-axis for the Radius MUTINT 154 (also referred to as "Radial MUTINT") or the rotor axis will be parallel to the Z-axis for the Tangent MUTINT 155. The Z axis is parallel to the portion of the subframe 52 closest to the central motor 1.) Pivot the rotor gimbal 55 laterally on the first axis in a CW direction while simultaneously engaging the central motor 1 on the third axis. As the CW orbit progresses (due to the central motor's torque) on the third axis, the step motor 53 on the first axis continues to pivot the gimbal 55 in a CW direction in a smooth, incremental fashion to complete ¼ of a turn. The torque (damped forcing torque) that the gimbal step motor 53 exerts during the ¼ turn on the first axis should be less than that of the central motor 1 (damping forcing torque) on the third axis. (Since, in phase 1, the torque from the central motor 1 on the third axis is relatively greater than that of the gimbal step motor 53 on the first axis, said ¼ turn should be completed shortly after the rotor 14 passes the 6 o'clock position.) Said ¼ turn causes the rotor 14 to precess into the CW direction of orbit on the third axis and, given the central motor's CW rotational direction on the third axis, said CW orbit incrementally hurries the original precession 262. Since the original precession is being hurried 262, now said precession (first precessional torque) has been redirected to being perpendicular to the orbit of the rotors and perpendicular to the overall movement of the inertial thruster. After the gimbal step motor 53 completes the ¼ turn, then the gimbal motor 53 stops pivoting the precession unit (i.e., the gimbal motor 53 becomes immobilized) on the first axis #t till the 9 o'clock position is reached.

The maximized-thrust phase 212 begins at the 9 o'clock position and continues to the 3 o'clock position. At the 9 o'clock position, decrease the torque being exerted by the central motor 1 on the third axis and/or brake the central motor 1 and cause the gimbal step motor 53 to laterally pivot the rotor gimbal 55 by ¼ of a turn on the first axis so that the rotor's axis is configured as it was at the onset of phase 1. (NOTE: A variation would be to maintain the same rotational velocity of the central motor 1 on the third axis but increase the torque of the gimbal motor 53 on the first axis.) Once the ¼ turn is complete, temporarily immobilize (turn of) the gimbal step motor 53 on the first axis. (In this phase-2 scenario, the torque from the central motor 1 on the third axis should be less than the torque from the gimbal step motor 53 on the first axis.) After the ¼ turn is completed now the axis of the rotor is parallel to the tangent of the orbit for the Radius MUTINT (or parallel to the Z-axis for the Tangent MUTINT). When said axis of the rotor is parallel to the tangent, the torque from the central motor's rotation will resultantly cause the spinning rotor 14 to have a tendency to precess. Since the rotor's second precessional torque will be passively 241 resisted 261 (delayed) by the gimbal step motor's immobilization, it will cause for the second precessional torque to be redirected by up to 90 degrees into the direction of orbit on the third axis and will therefore not negate the inertia gained by the displacement of the rotor's mass 14. At this point repeat phase 1 again, ad infinitum. NOTE: A variation would be to stop the spinning of the rotor motor 13 on the second axis at the beginning of phase 2 and restart it at the beginning of phase 1 however that would deprive phase 2 of any advantage gained from precessional redirection.

Operational Method IXa 289 (Bimodal Rotary Active Prolonged Method):

The minimized-thrust phase 210 of Operational Method IXa. This method uses a combination of the hurrying 262 and the delaying 261 of precession on a rotary MUTINT embodiment 112 (either of a Radius 154 or of a Tangent 155 MUTINT embodiment). (See FIGS. 4A and 5A.) The overarching strategy of this method is to alternate between hurrying and delaying torques by laterally pivoting the rotor gimbal 55 by up to ¼ of a turn two times during the minimized-thrust phase 211. Since there is a plurality of rotors 14 and since hurrying (and delaying) of precession redirects the original precession by 90 degrees, one half of the engine will be constantly undergoing the minimized-thrust phase 211 and one half of the engine will be constantly undergoing the maximized-thrust phase 212. The explanation for operational method IX will discuss only one of the rotors (rotor 1) since the same will be done for the other rotors when they pass a given "o'clock" position. Phase 1 for rotor 1 begins at the 3 o'clock position and continues to the 9 o'clock position.

For the purposes of the rotary MUTINT engine 112, the gimbal step motor pivot direction (i.e. CW or CCW) is determined as seen from the step motor 53 looking towards the rotor 14. Phase 1 begins with the rotor 14 spinning in a CCW direction for the Radial MUTINT (CW for the Tangent MUTINT). (If the tangent to the trajectory of the orbit is called the X-axis then the rotor axis will be parallel to the X-axis for the radius MUTINT 154 or parallel to the Z-axis for the Tangent MUTINT 155.)

First begin pivoting the rotor gimbal 55 in a CW direction. As the gimbal 55 rotates, simultaneously engage the central motor 1. As the CW orbit progresses, the step motor 53 continues to laterally pivot the rotor gimbal 55 in a CW direction in a smooth incremental fashion to complete 4 of a turn. Since the torque from the gimbal step motor 53 must be less than the torque from the central motor 1 then only part of the 4 turn will be completed (such as ³⁄₁₆ of a turn) before the precession unit passes the 6 o'clock position. At the 6 o'clock positon the step motor 53 reverses direction and returns the spinning rotor 14 to the position it was in at the start of the phase. Each of said h turns (or near h turns) alternatively causes the rotor 14 to precess into the CW direction of orbit and then opposing the direction of orbit. Resultantly the precession is alternatively hurried 262 and delayed 261. In both cases, since the damping forcing torque was the central motor's rotation, the hurrying 262 and the delaying 261 of precession, redirected the original precession to being perpendicular to the orbit of the precession unit.

The maximized-thrust phase 212 begins at the 9 o'clock position and continues to the 3 o'clock position. The step motor 53 remains immobilized thereby keeping the face of the spinning rotor 14 perpendicular to the X-axis for the Radius MUTINT (or keeping the face of the rotor perpendicular to the Z-Axis for the Tangent MUTINT). Since the original precession is being passively resisted 241 by the gimbal step motor's immobilization, said precession is redirected into the direction of travel.

Operational Method IXb 290 (Variant Bimodal Rotary Active Prolonged Method):

A variation to the above method would be to begin the minimized-thrust phase 211 so that the face of the rotor 14 is parallel to the direction of orbit and then, as phase 1 progresses, laterally pivot the gimbal 55 by ¼ a turn in a CW direction. The torque supplied by the central motor 1 would need to be of a greater magnitude that the torque supplied by the the step motor 53. This method is called bimodal because the first time that phase 1 occurs, the CW orbit of the central motor will induce a hurrying of the precession and the second time that phase 1 occurs there will be a delaying of precession. Of course, the third time that phase 1 occurs it will be again a hurrying of precession, as infinitum.

During phase 2 of this variation the face of the rotor would remain as it exited phase 1 i.e. parallel to the direction of orbit (and therefore with no need for precessional damping 292).

Operational Method X 291 (Prolonged-Passive-Delaying Submethod): Submethod X is a restatement, in generalized terms, encompassing most of the phase-2 (maximized thrust phase) methods. This method is called "prolonged" 252 because the original precession (second precessional torque) on the first axis is uniformly and incrementally delayed 261 for the entirety of phase 2. This method is "passive" 241 because it passively resists (delays) 261 the original precession on the first axis and thereby redirecting said precession by up to 90 degrees (onto the third axis). Said 90-degree redirection of precession (second precessional torque) is conveniently parallel to the overall direction of movement and therefore enhances the forward movement of the MUTINT during the maximized-thrust phase. The damping done on the first axis (when needed) during this method enhances the forward movement even though it is executed during the maximized-thrust phase 212. For more specific information, consult phase 2 of the preceding operational methods. NOTE: Though the Prolonged-Passive Method 291 is the method most frequently described in the above methodological explanations yet the No-damping method 292 (See below.) can also be adapted to phase 2 for any methodological embodiment.

Operational Method XI 292 (No-Damping Submethod):

This submethod is described in phase 2 of Operational Method IXb 290. This submethod is used when no damping is desired during the maximized-thrust phase. (Method XI has the nick name of the "Dry" method.) Method XI can be adapted to phase 2 of any methodological embodiment.

As to automating the five MUTINT embodiments 100, a person with ordinary skill in the art will know that if automation is used in any of the preceding Operational Methods that sensors 21 & 22 can be activated when the rotors 14 and the associated arms 29 have precessed to the desired position. The adjustable sensors 21 & 22 (or other method such as manual or pre-programmed signals/pulses) will send signals to the Programmable Automation Module 17 to turn the power off or on to the central motor 1 & 26; to apply the brake calipers 24; to modulate the speed and torque of a given motor, and any other such function to execute the full range of methodology without constant human intervention or oversight.

Glossary a: is defined as one or as more than one.

acceleration: the rate of change of velocity of an object with respect to time.

action: a thing done wherein there may or may not be a comparable reaction produced as a result.

active damping: this is the dynamic excitation or minimization of an oscillation wherein a dynamic movement either negates or amplifies the original precession.

active torque: is torque that involves angular movement or displacement.

actuator: a mechanical device for moving or controlling something.

ad infinitum: again and again in the same way.

angular velocity: is the time rate of change of angular displacement of a mass relative to the origin.

an: is defined as one or as more than one.

another: is defined as at least a second or more.

arc: a continuous portion (as of a circle or ellipse or a section of a circle or ellipse) of a curved line.

architecture: the conceptual structure and logical organization of an inertial thruster system wherein both methodological and mechanical embodiments are integrated.

axle: the bar, rod, tube, or shaft on which rotates components of the machine or apparatus.

bar collar: a ring-like device that goes over a tube, axle, or a shaft and that has protruding bar or rods to which accessories can be mounted.

bimodal: a device employing two types of precessional damping within its method of operations.

Bimodal-Rotary-Active-Prolonged Method 289: a method used to achieve or enhance inertial thrust.

braking caliper: the mechanism in a brake system that uses a pinching action to cause the brake pads to press onto the disk or other moving surface.

braking mechanism: a mechanical device capable of applying a braking action.

braking: the act or process of slowing or stopping a rotor, axle, shaft, or connecting arm in order to keep it stationary or immobilized.

brief torque duration: the passive resisting of precession for a partial portion of a phase.

circular trajectory: rotation along a circular path. It can be uniform, with constant angular rate of rotation and constant speed, or non-uniform with a changing rate of rotation.

circular: resembling or shaped like a circle or an ellipse whether two dimensional or three dimensional.

class: a set or category of things having some property or attribute in common and differentiated from others by kind, type, or quality.

clock wise (CW): in the direction of the rotation of the hands of a clock as viewed from the front or above; circularly to the right from a point taken as the top.

co-located: to locate or be located in jointly or together, as two or more units wherein they share space on the same mechanical device or platform.

configuration: an arrangement of elements in a particular form, figure, or combination.

connecting arms: a flexible or rigid beam, tube, lever, rod, or plate that has one end attached to to a rotating axle and the other end attached to a precession unit.

contracted configuration: the configuration of oscillatory inertial thrusters when the connecting arms are contracted and diagonal (or nearly parallel) to the axle.

counterbalance: a weight, mass, force, or torque that balances or offsets an opposing weight, mass, force, or torque.

counter-clock wise (CCW): in the opposite direction to the way in which the hands of a clock move around.

couple: is defined as connected, although not necessarily directly, and not necessarily mechanically.

coupled: is defined as connected, although not necessarily directly, and not necessarily mechanically.

curved trajectory: the arc or full circle described by an object moving while attached to a machine.

damped forcing torque: an oscilation or precessional movement that is the subject of receiving an external torque.

damping category: the category of damping that is comprised of passive and/or active damping.

damping forcing torque: is the torque that redirects the original precession by the use of a hurrying or precession or of a delaying of precession.

damping: is the use of an additional external torque or resistance to reverse, redirect, absorb, and interfere with the precessional movements, oscillations, or vibrations in such a way that said movements are either amplified or diminished. There are at least two types of damping: Active damping and passive damping.

degrees of freedom: in a mechanics context, are specific, defined modes in which a mechanical device or system can move. The number of degrees of freedom is equal to the total number of independent displacements or aspects of motion.

delaying of precession: this is a torque direction wherein precession is reversed, resisted, retarded, or delayed in such a way that precessional movement is opposed. Similar to "delay of precession."

device: a thing made or adapted for a particular purpose, especially a piece of mechanical or electronic equipment.

diagonal: a slanting straight pattern or line.

direction: the line or course on which something is moving or is aimed to move or along which something is pointing or facing.

discreet phase: a phase that is individually separate and distinct from the other.

displace: to cause (something) to move from its place.

displaceable gyroscopic rotor: a spinnable or rotatable rotor that can be moved or displaced.

displaceable: capable of being displaced or moved.

distinct phase: a phase that does not overlap with the other phase but is separate.

drivetrain: the group of components that deliver power from the motor or supplier of rotational power to the axle, shaft, rotors, subframe, precessable mass, subframe, and/or connecting arms. Same as "drive train."

duration: the length of time that something lasts.

embodiment: reference throughout this document to "one embodiment," "illustrative embodiments," "certain embodiments," and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

engine: a machine or mechanical device that converts motion, movement, torque, precession, or kinetic energy into linear or rotational movement.

enhance: to increase or improve the performance or quality of a trait, action, or condition.

extended configuration: the positioning of the connecting arms of an oscillatory device wherein said connecting arms are fully out or protruding.

flexible material: the flexible matter or substance from which a thing is made.

follows the other in succession: coming one after the other; repeats.

forcing torque: a torque that either creates original precession or that redirects said original precession. There are at least two types of forcing torques: damped forcing torque and damping forcing torque.

forward: a relative term referring to the direction that coincides with the general direction of movement of the inertial thruster.

gearing: something that consists of gears or gear-like material.

gimbal: a mechanism that can be pivoted at right angles.

gyroscope: a device consisting of a mass, bar, disk, or weight that is mounted so that it can vibrate, spin, orbit, or rotate wherein said mass, bar, disk, or weight can be of any shape or configuration so long as precession can be induced.

having: is defined as comprising (i.e., open language).

hinge (noun): a movable joint or mechanism on which an arm or lever swings as it moves.

hinge (verb): to attach or join with or as if with a hinge.

horizontal: parallel to, in the plane of, or operating in a plane parallel to the horizon or to a baseline.

hurrying of precession: a torque direction wherein precession is hurried or accelerated in the same direction that it was already moving.

including: is defined as comprising (i.e., open language).

induce: to do something, bring about or give rise to, bring on.

inertia: a property of matter by which it remains at rest or in uniform motion in the same straight line unless acted upon by some external force.

inertial thrust: the force or push created by an Inertial thruster.

inertial thruster: A device that achieves rectilinear movement without any reactive engagement with a supporting surface or fluid medium. It is substantially synonymous to an inertial-propulsion device and a reactionless drive.

laterally oriented: acting or placed at right angles (or nearly a right angles) to the line of motion or of strain.

maximized-thrust phase: the phase or stroke of an inertial propulsion device that generates the most thrust (when compared to the minimized-thrust phase).

means: when this term precedes a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means' is not intended to be limiting.

medium: a substance that makes possible the transfer of energy or force from one location to another.

methodology: a system or grouping of methods and/or submethods and/or techniques.

minimized-thrust phase: the phase or stroke of an inertial propulsion device wherein the objective is to generate the least amount of thrust possible (when compared to the maximized thrust phase).

mode of movement: the way, method, technique, fashion, or manner in which something moves or is displaced.

motor shaft: is a rotating machine element, usually circular in cross section, which is used to transmit power from one part to another, or from a machine which produces power to a machine which absorbs power. The various members such as pulleys and gears are mounted on it.

motor: a machine that supplies motive power for an engine, machine, transmission, or for some other device with moving parts.

motorized precessable mass: a rotor or mass that has a motor or power source attached so that said rotor or mass will spin, orbit, rotate, or vibrate and so that precession can be induced or caused at will.

movement: a change in position of an object over time.

No-Damping Method 292: the method used to achieve or enhance inertial thrust wherein the rotors are not actively precessing.

optional: available to be chosen but not obligatory.

or: is to be interpreted as an inclusive or meaning any one or any combination. An exception to this definition will occur only when a combination of elements, functions, steps or acts are in some way inherently mutually exclusive.

orbit: the curved path or trajectory of an object or component of a machine.

orbital: relating to an orbit or orbits.

original precession: the first precession that is induced or the precession that is produced by the damped forcing torque or the applied torque.

orthogonal: of or involving right angles; at right angles.

Oscillatory-Contracted-Overlapping-Brief-Passive-Delaying Method 282: a method to achieve or enhance inertial thrust.

Oscillatory-Extended-Brief-Passive-Delaying Method 286: a method to achieve or enhance inertial thrust.

Oscillatory-Prolonged-Active-Delaying Method 284: a method to achieve or enhance inertial thrust.

Oscillatory-Prolonged-Active-Hurrying Method 285: a method to achieve or enhance inertial thrust.

Oscillatory-Prolonged-Passive-Delaying Method 283: a method to achieve or enhance inertial thrust.

oscillatory: to swing or move back and forth either in a straight line or on a curved trajectory.

Oscillatory-Brief-Passive-Delaying Method 281: a method to achieve or enhance inertial thrust.

Oscillatory-Extended-Overlapping-Brief-Passive-Delaying Method 287: a method to achieve or enhance inertial thrust.

overlapping: not distinct but with shared time or space.

overlapping phase: a phase that is not distinct from the following phase in that both, for a portion of their duration, occur at the same time.

parallel orientation: lines, planes, surfaces, or objects that are aligned side by side and are basically equidistant.

passive damping: the lessening of precession by the static resistance that counters the precession.

passive torque: torque that is static in nature such as that caused by friction.

pendulous: having pendulum-like characteristics.

pendulum: a rod, bar, or lever that is attached to fixed point on which it can oscillate, move, or swing.

phase: the relationship in time between the successive states or cycles of a repeating system.

pitch: the steepness of a slope.

platform: a structure or machine on which mechanical devices can be mounted.

plurality: is defined as two or as more than two.

position: posture, alignment, or arrangement of a mechanical device capable of multiple configurations.

powertrain: the main components of an apparatus that generates power and delivers it to the rest of the machine.

precessable mass: any mass that is spun, rotated, or vibrated in such a way so as to induce precession, such as a spinning rotor, vibrating structure gyroscope, Coriolis vibratory gyroscope, cylindrical resonator gyroscope, piezoelectric gyroscopes, tuning fork gyroscope, or a vibrating wheel gyroscope.

precession units: all of the components related to or rigidly attached to a precessable mass, such as a spinning rotor, vibrating structure gyroscope, Coriolis vibratory gyroscope, cylindrical resonator gyroscope, piezoelectric gyroscopes, tuning fork gyroscope, or a vibrating wheel gyroscope.

precession: the movement of the axis of a spinning or vibrating body around another axis due to a torque acting to change the direction of the first axis.

profit: a financial gain, especially the difference between the amount earned and the amount spent in buying, operating, or producing something.

prolonged: the duration for the hurrying or delaying of precession that lasts most (or all) of a phase.

Prolonged-Passive-Delaying Method 291: a method that achieves inertial propulsion.

propel: to drive, push, or cause to move in a particular direction.

propulsive: tending r having power to propel.

protruding ends of subframe: the ends of the subframe that extend away from the center.

radial alignment: an alignment that radiates outwardly like the spokes of a wheel.

rate of movement: the rate at which something moves, is done, or acts.

reaction: an occurrence that may or may not be of the same degree or magnitude as the action that initiated said occurrence.

reactive: showing a response or reaction to a stimulus or action.

rearward: a relative term referring to the direction that opposes the net direction of movement of the inertial thruster.

rectilinear: consisting of or moving in a straight line.

redirect: to change the course or direction of.

redirection: the changing of the course or direction of precession.

reset spring: the spring that returns the connecting arm to its original place or position.

reset: to move (something) back to an original place or position.

rigid material: material that is stiff and difficult to bend. Not flexible.

rotary: (of motion) revolving around a center or axis; rotational.

rotatable frame: a frame that can be revolved around a center or axis; rotational frame.

rotatable structure: a structure that can be revolved around a center or axis.

rotation: the action of rotating, spinning, or orbiting around an axis or center.

rotor: the rotating member of a machine or device that capable of inducing precession; the rotating or spinning portion of a gyroscope or of a mass capable of being precessed.

shock absorber: a device for absorbing jolts, impact, angular momentum, and/or vibrations.

signal generator: a device that generates a repeating or non-repeating electronic or mechanical signal in either the analog or the digital domain.

spring: a resilient device, typically a helical metal coil, that can be pressed or pulled but returns to its former shape when released.

step motor: a motor which converts electrical pulses into discrete mechanical movements wherein the shaft or spindle of said motor rotates in discrete step increments when electrical command pulses are applied to it in the proper sequence. Also called a stepper or stepping motor.

strategic damping: damping that involves the hurrying or delaying of precession and ideally should be executed with the correct timing, for the correct duration, in the correct direction on a three-dimensional scale, with the correct category, and with the correct magnitude.

subframe: a supporting frame.

synchronization link: a rigid bar, lever, or plate, that is attached to the connecting arm and to a point on the central axis so that all of the connecting arms move in unison.

tangential alignment: the alignment with the tangent of the circular orbit of a device.

thrust: a force or a push.

torque direction: positive or negative torque. Also called the hurrying of precession or the delaying of precession.

torque: a twisting force that tends to cause rotation.

torque-induced precession (gyroscopic precession): is the phenomenon in which the axis of a spinning object moves at right angles to the direction that would normally result from the external torque. The same as gyroscopic precession.

torquing system: a system for applying one or more torques to a spinning rotor and/or to moveable components on an engine or on a machine so as to displace mass and/or modify the direction of the original precession.

trajectory: the curved or linear path followed by an object moving under through space or while connected to a rotating device.

travel: the length of a mechanical stroke or movement.

unimodal: using a single mode or technique.

Unimodal-Rotary-Active-Prolonged Method 288: a method used to achieve inertial thrust.

Variant-Bimodal-Rotary-Active-Prolonged Method 290: a method used to achieve inertial thrust.

vertical: at right angles to a horizontal plane; in a direction, or having an alignment, such that the top is directly above the bottom.

worm gear: a mechanical arrangement consisting of a toothed wheel worked by a short revolving cylinder (worm) bearing a screw thread.

worm-gear motor: a motor using a gear arrangement in which a worm (which is a gear in the form of a screw) meshes with a worm gear. Said motor has the advantage of being internally braked and therefore resists back-driveability.

The invention claimed is:

1. A method for operating an inertial thrust engine comprising:

rotating an axle of said engine in a first direction of rotation on a first axis, wherein the rotating of said axle displaces at least one precessable mass associated with said axle, wherein said at least one precessable mass spins in a second direction of rotation on a second axis, wherein upon displacing of said at least one precessable mass on said first axis, and upon spinning of said at least one precessable mass on said second axis, a first precessional torque is induced on a third axis, and wherein said first precessional torque comprises a force that is either substantially rearward and opposite to the general direction of movement of the engine or substantially forward and in the general direction of movement of the engine; and to define a minimized-thrust phase, applying a minimized-thrust phase damping forcing torque on said third axis simultaneously with a minimized-thrust phase damped forcing torque caused by the rotating of the axle on the first axis, wherein the minimized thrust phase damping forcing torque actively or passively damps said first precessional torque on said third axis, wherein said minimized-thrust phase damping forcing torque redirects the first precessional torque of said spinning at least one precessable mass in a perpendicular direction which is redirected to an axis that is substantially parallel to said first axis, and wherein the redirecting of the first precessional torque minimizes a rearward reaction of the engine in said minimized thrust phase; and to define a maximized-thrust phase, applying a maximized-thrust phase damping forcing torque to restrict or stop the rotating of the axle on said first axis and simultaneously applying a maximized-thrust phase damped forcing torque that reverses a curved trajectory of the at least one precessable mass on said third axis, and wherein said maximized-thrust phase damped forcing torque displaces the at least one precessable mass and causes an opposite reaction that produces a unilinear motion of the engine substantially forward and in said general direction of movement of the engine in said maximized thrust phase.

2. The method of claim 1, wherein said first precessional torque comprises a force that is substantially forward and in the general direction of movement of the engine, wherein applying a positive torque as the minimized-thrust phase damping forcing torque on said third axis actively damps said first precessional torque by further accelerating a curved trajectory of said at least one precessable mass substantially forward and in the general direction of movement of the engine, and wherein said minimized-thrust phase damping forcing torque is greater than said first precessional torque.

3. The method of claim 1, wherein said first precessional torque comprises a force that is substantially rearward and opposite to the general direction of movement of the engine, and wherein applying a negative torque as the minimized-thrust phase damping forcing torque on said third axis actively damps said first precessional torque by displacing said at least one precessable mass in a curved trajectory that is substantially forward and in the same general direction of movement of the engine, and wherein said minimized-thrust phase damping forcing torque is greater than said first precessional torque.

4. The method of claim 1, wherein said first precessional torque comprises a force that is substantially forward and in the general direction of movement of the engine, and wherein the applying of the minimized-thrust phase damping forcing torque on said third axis damps said first precessional torque by immobilizing the displacement of said at least one precessable mass, instantly reversing a curved trajectory of said at least one precessable mass, or applying partial resistance to the curved displacement of said at least one precessable mass.

5. The method of claim 4, wherein said immobilizing of the displacement of said at least one precessable mass is done, wherein the immobilizing is applied as said minimized-thrust phase damping forcing torque on said third axis before precession begins and only during a beginning of said minimized-thrust phase with said immobilizing continuing only until said first precessional torque is redirected to an axis that is substantially parallel to said first axis, and wherein said minimized-thrust phase damping forcing torque is of a force greater than said first precessional torque.

6. The method of claim 5, wherein said immobilizing of the displacement of said at least one precessable mass on said third axis is done by stopping a curved trajectory of said at least one precessable mass from moving into substantially the same direction as said general direction of movement of the engine by activating a torquing system to counter said first precessional torque from displacing said at least one precessable mass substantially forward and in the general direction of movement of the engine, and wherein the torquing system comprises at least an actuator.

7. The method of claim 6, wherein said torquing system has a dual function of both producing a maximized-thrust phase damped forcing torque and said minimized-thrust phase damping forcing torque on said third axis, wherein said maximized-thrust phase damped forcing torque initiates a second precessional torque by displacing said at least one precessable mass, and wherein said minimized-thrust phase damping forcing torque damps said first precessional torque.

8. The method of claim 5, wherein said immobilizing of the displacement of the at least one precessable mass on said third axis is done by locking said at least one precessable mass to restrain said at least one precessable mass from moving substantially forward and in the general direction of movement of the engine.

9. The method of claim 4, wherein a partial resistance is applied to said first precessional torque, wherein said partial resistance comprises a passive damping that slows the curved displacement of the at least one precessable mass on said third axis for a duration of said minimized-thrust phase, wherein the minimizing of a rearward reaction of the engine is achieved by a partial resistance of the first precessional torque resulting in the redirection of said first precessional torque, and wherein said passive damping generates a resistance less than that of said first precessional torque.

10. The method of claim 4, wherein the maximized-thrust phase damped forcing torque causes a reversal of the curved trajectory of the at least one precessable mass on said third axis during a portion of said maximized-thrust phase and initially generates a negative torque that causes a resistance and a delaying of said first precessional torque at an onset of said minimized-thrust phase.

11. The method of claim 1, wherein the at least one precessable mass is displaced by said minimized-thrust phase damping forcing torque at a constant angular velocity on said third axis so as to redirect the first precessional torque on said third axis to be parallel to said first axis during said minimized-thrust phase, wherein said minimized-thrust phase damping forcing torque is greater than said first precessional torque, and wherein said first precessional torque comprises a force that is substantially rearward and opposite to the general direction of movement of the engine.

12. The method of claim 1, wherein said maximized-thrust phase damped forcing torque creates a second precessional torque on said first axis if said precessable mass is spinning, wherein said maximized-thrust phase damping forcing torque redirects said second precessional torque in a perpendicular direction to said first axis, if said precessable mass is spinning, or does not redirect said second precessional torque, if spinning of said precessable mass is stopped.

13. The method of claim 12, wherein the minimized thrust phase and the maximized thrust phase follow one another in succession and are discrete or partially overlap with one another.

14. The method of claim 12, wherein said minimized-thrust phase and said maximized-thrust phase partially overlap with one another, wherein a reversal of the curved trajectory of the at least one precessable mass on said third axis during a portion of said maximized-thrust phase initially generates a negative torque that causes a resistance and a delaying of precession at an onset of said minimized-thrust phase, wherein said resistance is from a rearward momentum of the at least one precessable mass during said maximized-thrust phase, and wherein said rearward momentum is opposite to the general direction of movement of the engine.

15. The method of claim 12, wherein the maximized-thrust phase, if said precessable mass is spinning, redirects the precessional torque to an axis that is parallel to said third axis, and wherein said at least one at least one precessable mass has a curved trajectory that is substantially aligned with said general direction of movement of said engine.

16. The method of claim 12, wherein the maximized-thrust phase terminates or lessens the second precessional torque for a duration of the maximized-thrust phase by stopping or slowing a spinning of the at least one precessable mass.

17. The method of claim 12, wherein the maximized-thrust phase displaces the at least one precessable mass at an accelerating rate of movement.

18. The method of claim 17, wherein the momentum from said accelerating rate of movement is absorbed by at least one shock absorber at an end of said maximized-thrust phrase.

19. The method of claim 12, wherein said minimized-thrust phase and said maximized-thrust phase are carried out within two or more interconnected engines on a platform, and wherein said minimized-thrust phase and said maximized-thrust phase occur simultaneously or overlap so as to smooth out intermittent movement, thereby creating a generally continuous unidirectional motion of said platform.

20. The method of claim 12, wherein said axle is a powertrain with a dual function of producing a minimized-thrust phase damped forcing torque and producing said maximized-thrust phase damping forcing torque on said first axis, wherein said minimized-thrust phase damped forcing torque can cause a rotation in either direction of said powertrain and said at least one precessable mass, and wherein said maximized-thrust phase damping forcing torque immobilizes the rotation of said powertrain.

21. The method of claim 12, wherein said at least one precessable mass is a spinnable rotor, vibrating structure, gyroscope, or a seismic mass that can induce an orthogonal torque when said at least one precessable mass is spun or vibrated, as well as orbited on a curved trajectory.

22. The method of claim 12 wherein said minimized-thrust phase and said maximized-thrust phase follow one another in succession so as create said unidirectional motion in an intended direction of rectilinear movement of said engine and wherein said minimized-thrust phase and said maximized-thrust phase, in combination, comprise a methodology for operating of an inertial-thrust engine.

23. A method for operating an inertial thrust engine comprising:
rotating a shaft of said engine in a first direction of rotation on a first axis, wherein the rotating of said shaft moves at least one precessable mass associated with said shaft, wherein said at least one precessable mass spins in a second direction of rotation on a second axis, wherein upon moving of said at least one precessable mass on said first axis, and upon spinning of said at least one precessable mass on said second axis, a first precessional torque is induced on a third axis, and
wherein said first precessional torque comprises a force that is either substantially rearward and opposite to the general direction of movement of the engine or substantially forward and in the general direction of movement of the engine;
to define a minimized-thrust phase, applying a minimized-thrust phase damping forcing torque on said third axis simultaneously with a minimized-thrust phase damped forcing torque caused by the rotating of the shaft on the first axis, wherein the minimized-thrust phase damping forcing torque actively or passively damps said first precessional torque, wherein said minimized-thrust phase damping forcing torque redirects the first precessional torque of said spinning at least one precessable mass in a perpendicular direction; and
to define a maximized-thrust phase, applying a maximized-thrust phase damping forcing torque that damps a second precessional torque of the at least one precessable mass on said first axis and applying a maximized-thrust phase damped forcing torque that causes a curved trajectory of the precessable mass on said third axis, wherein said maximized-thrust phase damped forcing torque creates said second precessional torque on said first axis if said precessable mass is spinning, wherein said maximized-thrust phase damping forcing torque either redirects said second precessional torque in a substantially perpendicular direction if said at least one precessable mass is spinning, or does not redirect said second precessional torque if spinning of said at least one precessable mass is stopped, and wherein the movement of the at least one precessable mass causes an opposite reaction that produces a unilinear motion of the engine substantially forward and in said general forward direction of movement of the engine.

\* \* \* \* \*